(12) United States Patent
Sikora

(10) Patent No.: US 11,620,597 B1
(45) Date of Patent: Apr. 4, 2023

(54) MACHINE LEARNING REAL PROPERTY OBJECT DETECTION AND ANALYSIS APPARATUS, SYSTEM, AND METHOD

(71) Applicant: Vita Inclinata Technologies, Inc., Broomfield, CO (US)

(72) Inventor: Derek Sikora, Denver, CO (US)

(73) Assignee: Vita Inclinata Technologies, Inc., Broomfield, CO (US)

( * ) Notice: Subject to any disclaimer, the term of this patent is extended or adjusted under 35 U.S.C. 154(b) by 0 days.

(21) Appl. No.: 17/994,314

(22) Filed: Nov. 26, 2022

Related U.S. Application Data

(60) Provisional application No. 63/336,887, filed on Apr. 29, 2022.

(51) Int. Cl.
| | |
|---|---|
| *G06Q 10/0631* | (2023.01) |
| *G06V 10/774* | (2022.01) |
| *G06V 20/52* | (2022.01) |
| *G06V 10/82* | (2022.01) |

(52) U.S. Cl.
CPC ... *G06Q 10/063114* (2013.01); *G06V 10/774* (2022.01); *G06V 10/82* (2022.01); *G06V 20/52* (2022.01); *G06V 2201/07* (2022.01)

(58) Field of Classification Search
None
See application file for complete search history.

(56) References Cited

U.S. PATENT DOCUMENTS

| | | | |
|---|---|---|---|
| 1,935,283 A | 11/1933 | Adams | |
| 2,428,656 A | 10/1947 | Elliott et al. | |
| 2,513,646 A | 7/1950 | August | |
| 2,651,533 A | 9/1953 | Cecil | |
| 2,717,656 A | 9/1955 | Bannister | |
| 3,036,797 A | 5/1962 | Domenico | |
| 3,044,818 A | 7/1962 | Harry | |
| 3,210,115 A | 10/1965 | Irving et al. | |
| 3,265,336 A | 8/1966 | Peterson | |
| 3,498,476 A | 3/1970 | Mattson et al. | |

(Continued)

FOREIGN PATENT DOCUMENTS

| | | |
|---|---|---|
| AE | P60001212022 | 1/2022 |
| AE | P60009522022 | 5/2022 |

(Continued)

OTHER PUBLICATIONS

Task Runtime Prediction in Scientific Workflows Using an Online Incremental Learning Approach. Hilman et al. (Year: 2018).*

(Continued)

*Primary Examiner* — Delomia L Gilliard
(74) *Attorney, Agent, or Firm* — Martin Spencer Garthwaite

(57) ABSTRACT

Physical and logical components of an apparatuses, systems and methods for and related to detecting, identifying, and categorizing construction site objects and other objects on real property ("objects") through artificial intelligence machine learning analysis of object sensor data to identify an object in the object sensor data, to determine a categorization of the object, to determine at least one of a site map, a hazardous condition, a theft, and or a behavior of the objects and to output warnings and utilization reports with respect to equipment, vehicles, personnel.

20 Claims, 14 Drawing Sheets

(56) References Cited

U.S. PATENT DOCUMENTS

| | | |
|---|---|---|
| 3,554,468 A | 1/1971 | Mcvicar |
| 3,598,440 A | 8/1971 | Ramsden et al. |
| 3,601,342 A | 8/1971 | Piasecki |
| 3,602,544 A | 8/1971 | Marsh |
| 3,656,796 A | 4/1972 | Cook |
| 3,690,602 A | 9/1972 | Marsh |
| 3,829,052 A | 8/1974 | Flannelly |
| 3,833,189 A | 9/1974 | Fowler et al. |
| 3,838,836 A | 10/1974 | Asseo et al. |
| 3,904,156 A | 9/1975 | Smith |
| 3,946,971 A | 3/1976 | Chadwick |
| 4,124,181 A | 11/1978 | Kolwey |
| 4,138,078 A | 2/1979 | Hester et al. |
| 4,267,987 A | 5/1981 | McDonnell |
| 4,364,704 A | 12/1982 | Dreesen et al. |
| 4,378,919 A | 4/1983 | Smith |
| 4,553,719 A | 11/1985 | Ott |
| 4,601,444 A | 7/1986 | Lindenbaum |
| 4,695,012 A | 9/1987 | Lindenbaum |
| 4,747,745 A | 5/1988 | Pippen et al. |
| 4,826,109 A | 5/1989 | Camus |
| 4,881,601 A | 11/1989 | Smith |
| 4,883,184 A | 11/1989 | Albus |
| 4,889,297 A | 12/1989 | Ikeda |
| 4,984,757 A | 1/1991 | Hartung et al. |
| 5,071,184 A | 12/1991 | Dessaux |
| 5,071,573 A | 12/1991 | Coffindaffer et al. |
| 5,125,707 A | 6/1992 | Chaen et al. |
| 5,143,326 A | 9/1992 | Parks |
| 5,190,250 A | 3/1993 | DeLong et al. |
| 5,249,652 A | 10/1993 | Leitzman et al. |
| 5,273,333 A | 12/1993 | Hatfield et al. |
| 5,344,203 A | 9/1994 | Tollenaere |
| 5,352,056 A | 10/1994 | Chandler |
| 5,358,219 A | 10/1994 | Shenk et al. |
| 5,443,566 A | 8/1995 | Rushmer et al. |
| 5,451,032 A | 9/1995 | Rhoads |
| 5,465,925 A | 11/1995 | Connolly et al. |
| 5,499,785 A | 3/1996 | Roberts et al. |
| 5,518,205 A | 5/1996 | Wurst et al. |
| 5,524,870 A | 6/1996 | Tallent et al. |
| 5,562,394 A | 10/1996 | Brown, Jr. |
| 5,593,113 A | 1/1997 | Cox |
| 5,613,722 A | 3/1997 | Fandrich et al. |
| 5,871,249 A | 2/1999 | Williams |
| 5,898,746 A | 4/1999 | Baversten et al. |
| 5,961,563 A | 10/1999 | Overton |
| 6,189,834 B1 | 2/2001 | Dietz et al. |
| 6,199,793 B1 | 3/2001 | Hainsworth et al. |
| 6,439,407 B1 | 8/2002 | Jacoff et al. |
| 6,533,220 B2 | 3/2003 | Schuster |
| 6,578,796 B2 | 6/2003 | Maeda |
| 6,708,926 B2 | 3/2004 | Bonisch |
| 6,983,833 B2 | 1/2006 | Ivers et al. |
| 7,028,351 B1 | 4/2006 | Frieder et al. |
| 7,267,240 B2 | 9/2007 | Maurer et al. |
| 7,720,582 B2 | 5/2010 | Makinadjian |
| 7,887,011 B1 | 2/2011 | Baldwin |
| 7,948,237 B2 | 5/2011 | Kuzmin et al. |
| 8,131,384 B2 | 3/2012 | Karpman et al. |
| 8,157,205 B2 | 4/2012 | McWhirk |
| 8,226,042 B1 | 7/2012 | Howell et al. |
| 8,292,229 B2 | 10/2012 | Pancotti et al. |
| 8,413,923 B2 | 4/2013 | Brenner et al. |
| 8,496,279 B2 | 7/2013 | Aoki |
| 8,534,607 B2 | 9/2013 | Tardiff et al. |
| 8,534,608 B1 | 9/2013 | Cox, IV |
| 8,591,161 B1 | 11/2013 | Bernhardt |
| 8,840,355 B1 | 9/2014 | Kulesha |
| 8,886,402 B1 | 11/2014 | Lou |
| 8,888,048 B2 | 11/2014 | Figoureux et al. |
| 8,894,050 B2 | 11/2014 | Wootten et al. |
| 8,899,903 B1 | 12/2014 | Saad et al. |
| 8,903,568 B1 | 12/2014 | Wang et al. |
| 8,938,325 B1 | 1/2015 | McGinnis et al. |
| 8,967,533 B2 | 3/2015 | DeVaul et al. |
| 9,027,976 B1 | 5/2015 | Tollenaere |
| 9,096,294 B1 | 8/2015 | Dong et al. |
| 9,114,871 B2 | 8/2015 | Woodworth et al. |
| 9,194,977 B1 | 11/2015 | Dungan et al. |
| 9,205,922 B1 | 12/2015 | Bouwer |
| 9,223,008 B1 | 12/2015 | Hartman et al. |
| 9,242,741 B1 | 1/2016 | Cockell |
| 9,302,770 B2 | 4/2016 | Burgess et al. |
| 9,422,139 B1 | 8/2016 | Bialkowski et al. |
| 9,676,481 B1 | 6/2017 | Buchmueller |
| 9,688,404 B1 | 6/2017 | Buchmueller et al. |
| 9,800,091 B2 | 10/2017 | Nugent, Jr. et al. |
| 9,836,063 B1 | 12/2017 | Bonawitz et al. |
| 9,881,506 B1 | 1/2018 | Gentry |
| 9,908,756 B2 | 3/2018 | Heravi et al. |
| 10,023,312 B2 | 7/2018 | Repp et al. |
| 10,023,313 B2 | 7/2018 | Behrens et al. |
| 10,071,804 B1 | 9/2018 | Buchmueller et al. |
| 10,288,075 B2 | 5/2019 | Ishiba |
| 10,451,504 B2 | 10/2019 | Campbell et al. |
| 10,479,503 B2 | 11/2019 | Sikora et al. |
| 10,519,013 B2 | 12/2019 | Curran et al. |
| 10,676,190 B2 | 6/2020 | Mitchell et al. |
| 10,870,558 B2 | 12/2020 | Sikora et al. |
| 10,899,586 B2 | 1/2021 | Cranney, III |
| 10,940,061 B2 | 3/2021 | Sikora et al. |
| 11,008,198 B2 | 5/2021 | Sikora et al. |
| 11,142,316 B2 | 10/2021 | Sikora et al. |
| 11,142,433 B2 | 10/2021 | Sikora et al. |
| 11,209,836 B1 | 12/2021 | Sikora et al. |
| 11,339,034 B2 | 5/2022 | Sikora et al. |
| 11,370,642 B2 | 6/2022 | Markwell |
| 2003/0085319 A1 | 5/2003 | Wagner et al. |
| 2003/0121024 A1* | 6/2003 | Hill ............ G06F 8/71 717/115 |
| 2003/0220177 A1 | 11/2003 | Orlando |
| 2004/0026349 A1 | 2/2004 | Colgate et al. |
| 2004/0032140 A1 | 2/2004 | Solstad |
| 2005/0072965 A1* | 4/2005 | Sanders ............ B66D 1/54 254/361 |
| 2005/0242237 A1 | 11/2005 | Scott |
| 2007/0200032 A1 | 8/2007 | Eadie et al. |
| 2009/0004004 A1 | 1/2009 | Vincenzi |
| 2009/0152391 A1 | 6/2009 | McWhirk |
| 2010/0012771 A1 | 1/2010 | Jess |
| 2010/0176618 A1 | 7/2010 | Souke et al. |
| 2010/0291707 A1 | 11/2010 | Mirkin et al. |
| 2010/0319910 A1 | 12/2010 | Ives et al. |
| 2011/0192932 A1 | 8/2011 | Brenner et al. |
| 2012/0006779 A1 | 1/2012 | Mills et al. |
| 2012/0145832 A1 | 6/2012 | Schuster |
| 2012/0150364 A1 | 6/2012 | Tillotson et al. |
| 2012/0271582 A1 | 10/2012 | Bageshwar et al. |
| 2012/0292434 A1 | 11/2012 | Welsh |
| 2012/0293177 A1 | 11/2012 | Dodds |
| 2013/0054054 A1 | 2/2013 | Tollenaere et al. |
| 2013/0056586 A1 | 3/2013 | Occhiato et al. |
| 2013/0270393 A1 | 10/2013 | Shrapnel |
| 2013/0299634 A1 | 11/2013 | Haggard |
| 2014/0154965 A1 | 6/2014 | Han et al. |
| 2014/0224755 A1 | 8/2014 | Eriksson et al. |
| 2014/0252170 A1 | 9/2014 | Prud'Homme-Lacroix |
| 2014/0333232 A1 | 11/2014 | Verheyen |
| 2015/0041598 A1 | 2/2015 | Nugent et al. |
| 2015/0151837 A1 | 6/2015 | Sane et al. |
| 2015/0360779 A1 | 12/2015 | Behrens et al. |
| 2016/0009393 A1 | 1/2016 | Repp et al. |
| 2016/0031683 A1 | 2/2016 | Fenker et al. |
| 2016/0048131 A1 | 2/2016 | Lesperance et al. |
| 2016/0236779 A1 | 8/2016 | Thomas et al. |
| 2016/0297650 A1 | 10/2016 | Bang |
| 2016/0332728 A1 | 11/2016 | Winfree et al. |
| 2016/0340030 A1 | 11/2016 | Roussey et al. |
| 2016/0340035 A1 | 11/2016 | Duru |
| 2016/0340039 A1 | 11/2016 | Waltner et al. |
| 2017/0052676 A1* | 2/2017 | Pulier ............ G06F 3/017 |
| 2017/0073055 A1 | 3/2017 | Song |
| 2017/0088261 A1 | 3/2017 | Sequeira et al. |

(56) References Cited

U.S. PATENT DOCUMENTS

| | | |
|---|---|---|
| 2017/0129749 A1 | 5/2017 | Mijangos et al. |
| 2017/0138737 A1 | 5/2017 | Cordova et al. |
| 2017/0197718 A1 | 7/2017 | Buchmueller |
| 2017/0217566 A1 | 8/2017 | Ichinose |
| 2017/0276139 A1 | 9/2017 | Ishiba |
| 2017/0284795 A1 | 10/2017 | Carlson et al. |
| 2017/0291707 A1 | 10/2017 | Veronesi et al. |
| 2018/0072404 A1 | 3/2018 | Prager et al. |
| 2018/0099748 A1 | 4/2018 | Lesperance et al. |
| 2018/0208309 A1 | 7/2018 | Wang |
| 2018/0229855 A1 | 8/2018 | Sane et al. |
| 2018/0252616 A1 | 9/2018 | Bryson et al. |
| 2018/0282130 A1 | 10/2018 | Kale et al. |
| 2018/0339891 A1 | 11/2018 | Ijadi-Maghsoodi et al. |
| 2019/0031474 A1 | 1/2019 | Stilborn et al. |
| 2019/0033892 A1 | 1/2019 | Gomez et al. |
| 2019/0055111 A1 | 2/2019 | Cranney, III |
| 2019/0193827 A1 | 6/2019 | Zerweckh |
| 2019/0236370 A1* | 8/2019 | Man ................... G06Q 10/0633 |
| 2019/0241267 A1 | 8/2019 | Sikora et al. |
| 2019/0337776 A1 | 11/2019 | Fanello et al. |
| 2020/0087121 A1 | 3/2020 | Ohayon et al. |
| 2020/0180763 A1 | 6/2020 | Schütz et al. |
| 2020/0182252 A1 | 6/2020 | Nakasuji et al. |
| 2020/0210704 A1* | 7/2020 | Han ..................... G06V 10/454 |
| 2020/0231415 A1 | 7/2020 | Sikora et al. |
| 2020/0271270 A1 | 8/2020 | Sikora et al. |
| 2020/0369492 A1 | 11/2020 | Sikora et al. |
| 2020/0400330 A1* | 12/2020 | Przybylski ................ G06F 9/28 |
| 2021/0371250 A1 | 12/2021 | Bedgood et al. |
| 2021/0371252 A1 | 12/2021 | Sikora et al. |
| 2022/0121225 A1 | 4/2022 | Sikora et al. |
| 2022/0135378 A1 | 5/2022 | Sikora et al. |
| 2022/0277472 A1* | 9/2022 | Birchfield ................. G06T 7/60 |
| 2022/0371736 A1 | 11/2022 | Sikora et al. |

FOREIGN PATENT DOCUMENTS

| | | |
|---|---|---|
| AE | P60009562022 | 5/2022 |
| AU | 2020223104 A1 | 9/2021 |
| AU | 2020316044 A1 | 2/2022 |
| AU | 2019217244 C1 | 3/2022 |
| AU | 2020391500 A1 | 6/2022 |
| AU | 2020394206 A1 | 6/2022 |
| CA | 3148446 A1 | 1/2021 |
| CA | 3159310 | 5/2022 |
| CA | 3159437 | 5/2022 |
| CN | 114423703 A | 4/2022 |
| DK | 201900074 U1 | 6/2022 |
| EP | 0606108 A1 | 7/1994 |
| EP | 3749604 | 8/2020 |
| EP | 3924251 A1 | 12/2021 |
| EP | 3999463 A1 | 5/2022 |
| EP | 208930347 | 5/2022 |
| EP | 208930354 | 5/2022 |
| GB | 2327657 A | 2/1999 |
| GB | 2457149 A | 8/2009 |
| GB | 2513646 A | 11/2014 |
| GB | 2513646 B | 11/2014 |
| IN | 202217035319 | 6/2022 |
| IN | 202217036526 | 6/2022 |
| IR | 14005014000300827 | 1/2022 |
| JP | H04256686 A | 9/1992 |
| JP | 04256686 | 11/1992 |
| JP | 07179288 | 7/1995 |
| JP | H07179288 A | 7/1995 |
| JP | 09317795 A | 12/1997 |
| JP | H09317795 A | 12/1997 |
| JP | 10305989 | 11/1998 |
| JP | H10305989 A | 11/1998 |
| JP | H1111859 A | 1/1999 |
| JP | 2013203394 A | 10/2013 |
| JP | 2016210607 A | 12/2016 |
| JP | 2017500257 A | 1/2017 |
| JP | 2018140860 A | 9/2018 |
| JP | 2021011386 A | 2/2021 |
| JP | 2022529961 A | 6/2022 |
| JP | 2022530316 A | 6/2022 |
| KR | 1020227021644 | 6/2022 |
| KR | 1020227021645 | 6/2022 |
| NO | 20171181 A1 | 1/2019 |
| RU | 2022101373 | 1/2022 |
| WO | 2011012915 A1 | 2/2011 |
| WO | 2014076189 A1 | 5/2014 |
| WO | 2018234670 A1 | 12/2018 |
| WO | WO2019156782 A1 | 1/2019 |
| WO | WO2021016277 | 7/2020 |
| WO | 2020167867 A1 | 8/2020 |
| WO | 2020176665 A1 | 9/2020 |
| WO | WO2021108703 | 11/2020 |
| WO | WO2021108714 | 11/2020 |
| WO | 2021194628 A2 | 9/2021 |
| WO | PCTUS2165355 | 12/2021 |

OTHER PUBLICATIONS

U.S. Appl. No. 16/847,448, filed Apr. 13, 2020, Derek Sikora.
U.S. Appl. No. 17/748,985, filed May 19, 2022, Derek Sikora.
U.S. Appl. No. 17/750,015, filed May 20, 2022, Derek Sikora.
U.S. Appl. No. 17/752,509, filed May 24, 2022, Derek Sikora.
U.S. Appl. No. 18/875,873, filed Jul. 7, 2022, Derek Sikora.
U.S. Appl. No. 62/627,920, filed Feb. 8, 2018, Derek Sikora.
U.S. Appl. No. 62/757,414, filed Nov. 8, 2018, Vita Inclinata Technologies, Inc.
U.S. Appl. No. 62/804,020, filed Feb. 11, 2019, Derek Sikora.
U.S. Appl. No. 62/810,875, filed Feb. 26, 2019, Derek Sikora.
U.S. Appl. No. 62/833,394, filed Apr. 12, 2019, Derek Sikora.
U.S. Appl. No. 62/876,721, filed Jul. 21, 2019, Caleb B. Carr.
U.S. Appl. No. 62/940,155, filed Nov. 25, 2019, Derek Sikora.
U.S. Appl. No. 62/966,851, filed Jan. 28, 2020, Derek Sikora.
All pages, Written Opinion dated Apr. 30, 2020 for PCT Application No. PCT/US2020/017790, filed Feb. 11, 2020.
Extended European Search Report and Search Opinion, Application No. EP 19 751 097.7, dated Aug. 31, 2021, 15 pages.
Internal Search Report dated Apr. 30, 2020 for PCT/US2020/017790, filed Feb. 11, 2020.
International Search Report dated Apr. 3, 2019, for PCT/US19/13603 filed Jan. 15, 2019.
International Search Report in PCT/US2020/062414, dated Feb. 19, 2021, entire document.
International Search Report dated May 27, 2020 for PCT.US20/19967 filed Feb. 26, 2020.
International Search Report dated Oct. 6, 2020, for PCT/US2020/042936, filed Jul. 2020.
Phillip J. McKerrow, The design of a tethered aerial robot, Faculty of Informatics—Papers (Archive) Faculty of Engineering and InformationSciences University of Wollongong, Oct. 4, 2007, pp. 1-8, University of Wollongong, Australia, https://ro.uow.edu.au/infopapers/519.
Written Opinion in PCT/US2020/062414, dated Feb. 19, 2021, entire document.
Written Opinion dated Apr. 3, 2019, for PCT/US19/13603, filed Jan. 15, 2019.
Written Opinion dated Apr. 30, 2020 for PCT/US20/017790, filed Feb. 11, 2020.
Written Opinion dated May 27, 2020, for PCT/US20/19967, filed Feb. 26, 2020.
Written Opinion dated Oct. 6, 2020 for PCT/US2020/042936 filed Jul. 21, 2020.
Young, L.A ,"Enhanced Rescue Lift Capability", 63rd Annual Forum of the AHS international, Virginia Beach, VA, May 1-3, 2007 (May 2007). FIG.2,5,12,16, Abstract pp. 6-12.

* cited by examiner

MACHINE LEARNING REAL PROPERTY OBJECT DETECTION AND ANALYSIS APPARATUS, SYSTEM, AND METHOD

FIELD

This disclosure is directed to improved apparatuses, systems and methods for and related to detecting, identifying, categorizing construction site objects and other objects on real property sites ("objects") through visual analysis of images, to associating such objects with object sensor data, to determining and responding to object behaviors, wherein visual analysis, determining, and responding are performed at least in part by an artificial intelligence machine learning system, and furthermore to outputting images of sites, including stitched images of sites, to visually distinguish objects in such images and associating objects in such images with object sensor data.

BACKGROUND

Construction sites and other real property (herein, "sites") often comprise people, vehicles, machinery, materials, and other objects, including objects that are to be or are being incorporated into a building or into the landscape. People, vehicles, and machinery may move in areas on a site such as in paths, roads, and the like; some such areas may be designated to be used by an authority; some such areas may be used without authorization. Hazardous conditions may occur, both deliberately and inadvertently, such as areas below, adjacent to, or in the path of an object with high potential or kinetic energy, such as beneath a crane or adjacent to a partially constructed building, areas in which vehicles and machinery may move, and the like.

Property owners, property managers, construction site managers, construction site workers, governmental and private sector authorities, and the like would like to understand and monitor use of sites and activities thereon for a wide range of reasons, such as, e.g. to identify hazardous situations, to reduce accidents, to monitor movement of people, vehicles, materials, and surface water onto and off of a site, to monitor wind speed, to monitor the status of construction projects, to monitor utilization of site resources (e.g. of cranes, machinery, human workers, etc.), to determine profiles of loads suspended beneath cranes (size, shape, and type of suspended loads), to monitor differences between planned construction and as-built construction, to confirm conformance with zoning and property lines, and to monitor the status and use of buildings.

However, monitoring sites with humans is expensive, even if some monitoring services are provided remotely. In addition, human evaluation can be inconsistent. Systems have been developed to monitor and control aspects of real property and construction sites with reduced human involvement, e.g. motion sensors, infrared sensors, lasers, light detection and ranging sensors ("LIDAR sensors"), radar sensors, acoustic sensors, smoke sensors, carbon monoxide sensors, radio-frequency identifiers ("RFIDs"), load sensors on cranes, cameras, access control systems, and the like. However, such systems may be "brittle", in the sense that they may be built with a physical and logical configuration, wherein the physical and logical configuration must be planned, designed, and implemented to address a particular situation to be monitored. For example, an RFID system may require that users possess an RFID chip, cellular telephone, or other radio-frequency transmitter which transmits an identifier; such an RFID system may be able to determine if users with functioning transmitters come into a monitored area, provided the monitored area is instrumented with functioning receivers (or transceivers).

Artificial intelligence systems coupled to cameras may be able to, for example, distinguish different objects, e.g. an dog from a human, based on analysis of images, but may not determine physical characteristics of objects, may not determine behaviors of objects, may not have an elevation view of a site, may not have a view from multiple camera positions, may not perform a time-series analysis of objects, may not identify hazardous conditions, and furthermore may comprise an architecture which may be computationally expensive to train and which may have a computationally expensive runtime.

As used herein, "carrier" may refer to a crane, a helicopter, a drone, a fixed-wing aircraft, a lighter-than-air aircraft, a satellite or another vehicle capable of movement, or a fixed building, pole, tower, tree, cliff, or other object or structure generally not capable of movement, all of which have or can provide a view of a site, wherein the view of the site may be at a ground level of the site or may be above the site, and which is capable of carrying a camera or other sensor ("object sensors"), wherein the object sensor collects object sensor data with respect to objects in a site.

In some instances, operators of carriers may use equipment that provides some control of a load suspended below the carrier on a suspension cable ("suspended load"). This equipment may control the suspended load through use of winches to reel the load up or down relative to the carrier, through use of powered fans (or other actuators) to propel thrust fluid and generate thrust, through use of reaction wheels, or the like (all of which may be referred to herein as a "thruster"), at or near the suspended load. Such equipment is referred to herein as a suspended load control system ("SLCS"). When they include thrusters, SLCS are known to be able to control yaw of a suspended load and, if the thrust/mass ratio of the SLCS is high enough, to control pendular motion of the suspended and or to horizontally translate the suspended load, such as away from a lowest hanging position below the carrier.

Needed is a system, method, and or apparatus to train a machine learning neural network to identify and categorize objects found at a site through analysis of data from object sensors, such as through analysis of an image of a site, and to output a runtime object detection neural network, wherein the runtime object detection neural network is to identify and categorize objects based on analysis of data from object sensors, such as based on analysis of images of the site.

Furthermore, needed is a system, method, and or apparatus to train a neural network to perform a time-series analysis of objects and to output a runtime object time-series analysis neural network, wherein the runtime object time-series analysis neural network is to determine at least one of a site map or a behavior of an object in the site.

DETAILED DESCRIPTION

Figure 1:
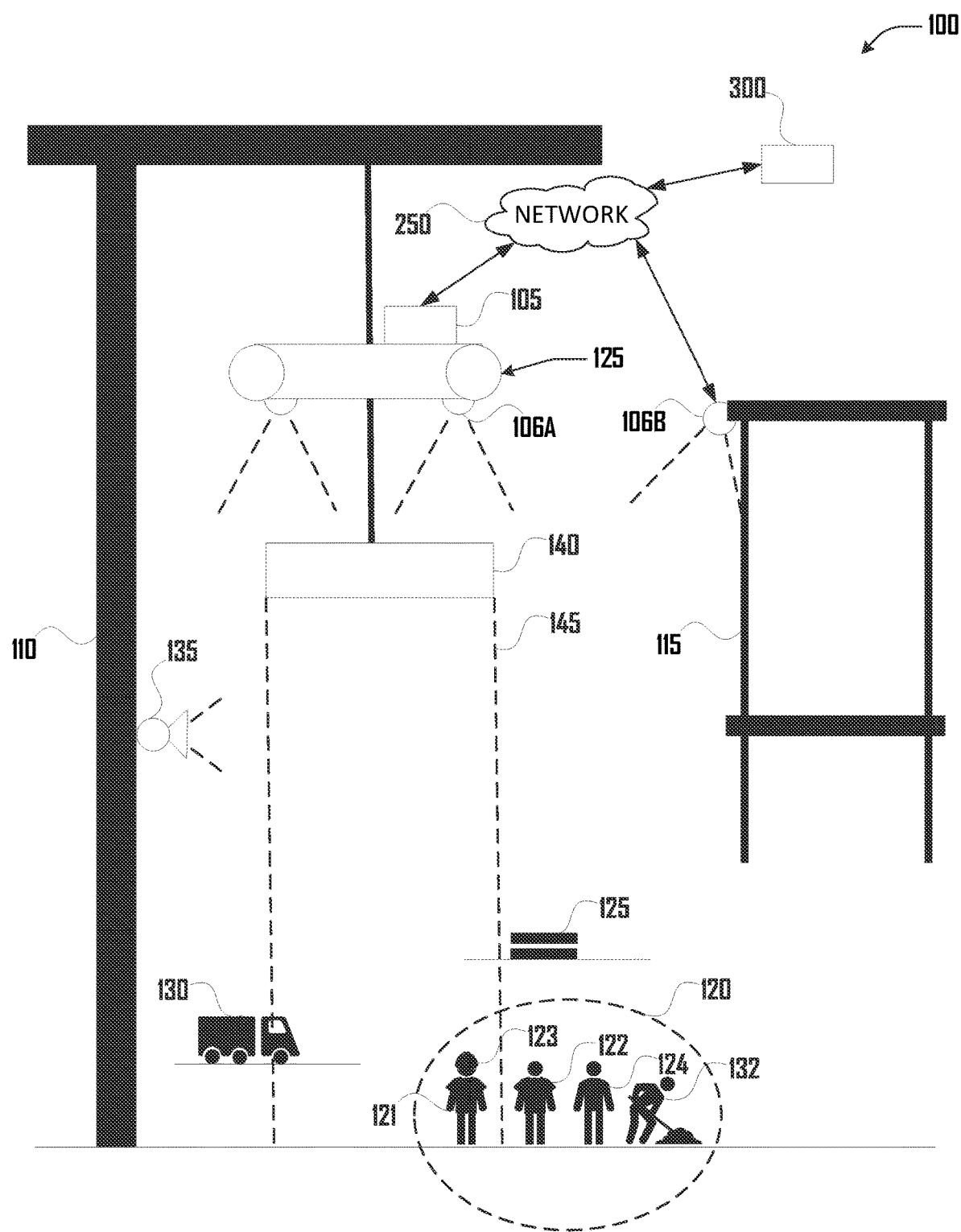
FIG. 1 illustrates a site comprising a crane, a site monitor machine learning computer, a suspended load control system, a suspended load, a hazardous condition, a warning beacon, a vehicle, a safety equipment, people in a site, a site building material, and a site building.

In the following, numbers refer to numbers in the drawing figures found in sheets 1 through 14; such numbers identify elements in the figures; the elements in the figures illustrate examples. When the numbers are followed by a letter, elements with a common number, 1305A and 1305B, are intended to be understood to represent generally equivalent units.

In overview, a site monitor machine learning computer, e.g. site monitor machine learning computer 150 or site monitor machine learning computer 300, comprises physical and logical components. The physical components may comprise a housing of site monitor machine learning computer, a camera or other object sensor, e.g. object sensor 106A or object sensor 106B, computer processor and 315, computer device memory 350, network interface 330, and input 345 and output 340 interfaces. The object sensor may be in or part of a housing of site monitor machine learning computer, e.g. object sensor 106A integrated into a housing of suspended load control system 125, or may be remote therefrom, e.g. object sensor 106B.

Records regarding object sensors, such as to identify object sensors, may be stored as, for example, one or more object sensor 460 record and records regarding object sensor data may be stored as, for example, one or more object sensor data 405 records in site monitor machine learning computer datastore 400 within computer device memory 350.

Logical components of site monitor machine learning computer 300 may comprise object identification neural training module 500, time-series neural training module 600, runtime generation module 700, runtime object identification module 800, runtime object time-series analysis module 900, image stitching module 1200, and visualization module 210, which modules may be stored in site monitor machine learning computer memory 350.

One or more of the physical components, such as the camera or other object sensor, such as object sensor 106A and object sensor 106B, may be in one or more locations with a view of site 100 (hereinafter referred to in the singular, as "sensor location"). The sensor location may be a relatively high elevation, with a high view relative to the site. The sensor location may be on and or beneath a carrier, such as construction crane 110, a tower, a pole, building 115, and the like. The sensor location may be suspended on a suspension cable beneath the carrier, wherein the carrier may also move construction materials. The sensor location may be on a person, a drone, or the like who may move about on or in proximity to the site.

The logical components may train an object detection neural network ("ODNN") of the site monitor machine learning computer, such as object identification neural training module 500, to identify objects in object sensor data 405 recorded by object sensor 460. E.g. object identification neural training module 500 may be trained to identify objects based on analysis of images from a camera or based on analysis of other object sensor data from another object sensor. Identified objects may be saved as, for example, one or more object 410 record. Object 410 records may comprise a weight, strength, or other indicator of confidence ("confidence level") regarding the ODNN's identification of the object 410. Multiple, including multiple overlapping, objects may be identified in object sensor data processed by the ODNN.

The ODNN may further be trained to categorize or describe identified objects. Categorizations of objects may comprise, for example, a carrier, a type of carrier, e.g. a crane, a suspended load carried by a crane, a person, an authorized person, a non-authorized person, a safety equipment (e.g. a helmet, vest, fence, safety rope, or the like), a site mechanical equipment and or a type of site mechanical equipment, e.g. an SLCS, a vehicle, a saw, a pneumatic equipment, a hammer, a wrench, or the like, a site building, a site building material, contacting objects, other objects found on sites over time which the ODNN may be trained to recognize and categorize.

The ODNN may be trained to identify and output object 410 records as well as categorizations of objects, object labels, and the like (hereinafter, "object category"). Object categories may be stored in, for example, one or more object category 450 record. More than one object category may be output per object 410. Object categories may further comprise a confidence level associated with the object category.

The output of the ODNN may further comprise identification of what portion of the object sensor data triggered identification of object 410. E.g. portions of images which prompted the ODNN to identify the object and object category. Such portion of the object sensor data may be stored as, for example, one or more object-triggering object sensor data 475 record. Such output may comprise or make possible identification of the object in the original source object sensor data; e.g. such output may comprise an original image with identified objects highlighted or otherwise identified in the image.

Output of the trained ODNN may further comprise or be in the form of one or more vectors, tensors, or the like (hereinafter, "tensor"), wherein the tensor encodes at least one of the object sensor data (e.g. an image), an object within the object sensor data, an object category, and or a confidence level of at least one of the object and or the object category. Such tensors may be stored as one or more object tensor 465 records in site monitor machine learning computer datastore 400.

Unless the context makes clear, references herein to processing images, categories, sensor data, and or confidence levels should be understood to refer to either or both of processing i) images, categories, object sensor data, and or confidence levels and or ii) tensors encoding images, categories, object sensor data, and or confidence levels.

The trained ODNN may be output as an executable a runtime object detection neural network 425 record, which may be incorporated into a runtime application, such as runtime object identification module 800, by, for example, runtime generation module 700.

The executable ODNN may be performed by, for example, runtime object identification module 800, which may be used to identify and categorize objects at a site, such as at a construction site. During performance of runtime object identification module 800, corrections from a human or another process, if any, may be stored and fed back as training data to the ODNN in object identification neural training module 500.

Output of the executable ODNN, e.g. object tensors encoding objects identified by the ODNN, categories of such objects, object sensor data which triggered identification of the objects, and or confidence levels of one or both objects and object categories may be input to a time-series neural network ("TSNN"), such as in time-series neural training module 600.

The TSNN may be trained to identify a site map of a site and behaviors of objects in the site. The behavior of the object may comprise, for example, at least one of an object movement, a speed, an object movement preceding contact, an object contact, an instance of a crane picking up an object (hereinafter, a "crane pick"), a hazardous condition, a theft, and an accident.

The trained TSNN may be output as an executable runtime time-series analysis neural network 430 record which may be incorporated into a runtime application, such as runtime object time-series analysis module 900, by, for example, runtime generation module 700.

The executable TSNN may be performed by, for example, runtime object time-series analysis module 900, which may be used to determine a site map of a site and behaviors of objects on the site. During performance of runtime object time-series analysis module 900, corrections from a human or another process, if any, may be stored and fed back as training data to the TSNN in time-series neural training module 600.

Output of the executable TSNN may comprise a site map of a site, and behaviors of objects on the site. Output of the executable TSNN may further comprise object sensor data associated with categories of objects. Output of the executable TSNN may further comprise equipment, vehicle, and personnel utilization as well as other output, such as alarm or notification in response to hazardous conditions, and the like.

In embodiments, the object sensor discussed herein may comprise a sensor which obtains or produces data or information regarding objects identified by the ODNN. The object sensor may comprise, for example, a camera, a microphone, an accelerometer, a volt meter, an ampere meter, a scale, a global positioning system, a radar system, a sonar system, a depth sensor, a LIDAR system, a fluid level sensor, a pH sensor, a speed sensor, a compass, a pressure sensor, a magnetic field sensor, an electrical field sensor, a temperature sensor, a wind speed sensor and the like, wherein the sensor may measure information of or related to an object, such as electromagnetic radiation reflected or emitted by the object, a sound or decibel level, an acceleration, a voltage, an amperage, a mass or weight, a position or location, a size, a relative position, a density, a distance, a fluid level, a pH, a speed, an orientation, an atmospheric pressure, a pressure on or of a component, a magnetic field, an electrical field, a temperature, a wind speed, and the like.

In embodiments, the object sensor may be part of a system, wherein the system obtains and processes information and may report a product thereof, wherein the reported product is referred to herein as object sensor data.

For example, in embodiments the object sensor may be an SLCS, e.g. SLCS 1300. For example, the SLCS may comprise a sensor suite, actuators such as thrusters, a computer processor and a computer memory, wherein the computer memory may comprise a suspended load control module in the computer memory.

When executed by the computer processor of the SLCS, the suspended load control module may obtain sensor data from sensors of the SLCS and process the SLCS sensor data in or according to state estimation modules, wherein the state estimation modules may comprise a system model. Certain of the information determined by the system model may be described as "state information" or as "states" and certain of it may be described as "parameter information" or as "parameters". For example, parameters may comprise elements which may be actively varied by the SLCS, such as a length of suspension cable and movement control settings of the carrier (when the SLCS can control the carrier or obtain information from the carrier), thrust output of thrusters of the SLCS, and the like. For example, "state information" may comprise elements which may not be actively varied by the SLCS and or which may respond to changes in parameters, such as, for example, a mass of SLCS and suspended load, a moment of inertia of an SLCS and suspended load, position and motion of the SLCS and suspended load, position and motion of the carrier, power use, battery condition, as well as disturbances, such wind force. Significantly, parameter information, state information, and disturbance forces may not be "hard-wired" into the SLCS as fixed values but may be dynamically determined by logical components thereof, according to the system model.

The sensor suite of an SLCS may comprise a camera, a vector navigation unit, and remote interface units. The vector navigation unit of an SLCS may include an inertial measurement unit ("IMU"), also referred to as an orientation measurement system. The IMU may provide inertial navigation data to the suspended load control module, such as from 3 degree of freedom (3 DoF) accelerometers, gyroscopes, magnometer or magnetometer such as a compass, an inclinometer, a directional encoder, a radio frequency relative bearing system, and gravitational or acceleration sensors, which may comprise microelectromechanical systems (MEMS) sensors. The IMU may include an integrated processor to provide on-board state estimation that fuses together data from the sensors in the IMU, in which case the IMU may be referred to as an Inertial Navigation System ("INS"). The SLCS may comprise or be communicatively coupled to one or more sensors in addition to the IMU. Such additional sensors may comprise, for example, an absolute position measurement system, a proximity sensor, LIDAR sensors and systems (e.g., point, sweeping, rotating, radial, distance, or linear), ultrasonic sensors, optical sensors such as one or more cameras or infrared (IR) sensors, and thrust sensors instrumented to determine thrust output by actuators of the SLCS, such as by thrusters. Proximity sensors may include ground height sensors and object proximity sensors. The absolute position measurement system may include global positioning system (GPS) sensors.

The remote interface unit of an SLCS may provide input to the SLCS and suspended load control module, e.g. to provide a functional mode or command state or to provide further input such as a location (or position) and or an orientation. The functional mode or command state may be an instruction to the SLCS to idle, to maintain a location or orientation relative to a carrier, to move to or toward a location, to hold a position, or to respond to direct user input. The location or orientation may be a location or orientation of the remote interface unit or a location or orientation input into the remote interface unit by a user or another process.

When executed by the processor of the SLCS, the suspended load control module and system model of an SLCS may determine, for example, a current state of the SLCS and a suspended load and may estimate a future state of the SLCS and suspended according to the system model. The current and future state may comprise a center of orbit of the carrier, a center of orbit of the SLCS, a target location for a suspended load, a mass of the SLCS and suspended load, a length of the suspension cable (at times when this is a state, not a parameter that can be varied), a moment of inertia of SLCS and suspended load, a movement and rotation of the SLCS and suspended load, a height above ground of the SLCS, a movement and rotation of the carrier, a height above ground of the carrier, and disturbance estimations of wind force on the SLCS and load, and relative motion between the SLCS and carrier.

Based on the current state, with feedback from the estimated future state and the functional mode or command state, the suspended load control module of an SLCS may modify parameters of the SLCS in order to achieve objectives of the functional mode or command state.

Sensors of the SLCS may act as object sensors for the site monitor machine learning computer. State and parameter information sensed or determined by the SLCS or by another object sensor may be stored in site monitor machine learning computer datastore 400 as one or more object sensor data 460 record.

In embodiments in which the object sensor is a camera, an image stitching module, e.g. image stitching module 1200, may stitch together multiple images of a site into one or more composite site image. Site maps, objects, object categories, object behaviors, and object sensor data associated with object categories may be identified in the composite site image through the output of the ODNN and the TSNN.

In this way, a system, method, and or apparatus may train a neural network to identify and categorize objects of a site through analysis of object sensor data, such as through analysis of images of a site, and to output a runtime ODNN, wherein the runtime ODNN identifies and categorizes objects, wherein the categorization comprises at least one of a carrier, a person, an authorized person, a non-authorized person, a safety equipment (helmet, vest, fence), a site mechanical equipment, a site building, a site building material, or the like.

Furthermore, in this way, a system, method, and or apparatus may train a neural network to perform a time-series analysis of objects and is to output a runtime TSNN, wherein the runtime TSNN is to determine at least one of a site map and or behavior of the object. The behavior of the object may comprise at least one of an object movement, a speed, an object movement preceding contact, an object contact, a crane pick, a hazardous condition, a theft, an accident, and the like. Accidents may comprise, for example, a contact between objects, a contact between objects where at least one object has high potential or kinetic energy, an unexpected contact between objects, an atypical contact between objects, and the like.

The system, method, and or apparatus may be aloft on a construction crane, such as on a suspension cable. The system, method, and or apparatus may be a component of or have access to an object sensor, such as, for example, an SLCS. The SLCS or other object sensor may provide state or parameter information of the SLCS or of an object monitored by the object sensor, wherein the state or parameter information may further be used to train the TSNN to determine behaviors of objects detected in images recorded at a site. Furthermore, the system, method, and apparatus may output equipment, vehicle, and personnel utilization. Furthermore, the system, method, and apparatus may output an alarm or other output in response to hazardous conditions, and the like.

The disclosed systems, methods, and or apparatus may thereby monitor sites and activities on sites with machine learning artificial intelligence systems.

Reference is now made in detail to the description of the embodiments illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein. Embodiments are illustrative examples and in no way limit the disclosed technology to any particular application or platform.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. As used in this specification and the appended claims, the singular forms "a," "an," and "the" include plural referents unless the content clearly dictates otherwise. It should also be noted that the term "or" is generally synonymous with "and/or" or "and or" unless the content clearly dictates otherwise.

FIG. 1 illustrates construction site 100 comprising a carrier, e.g. crane 110, site monitor runtime computer 105, camera or object sensor 106A and camera or object sensor 106B, suspended load control system 125 ("SLCS 125"), suspended load 140, hazardous condition 145, warning beacon 135, vehicle 130, helmet safety equipment 123, visibility safety equipment 122, people in site 120, including authorized person 121, non-authorized person 124, site building material 126, and site building 115; also illustrated is site monitor machine learning computer 300 and network 250. Site building 115 may also be acting as a carrier, as it holds or carries object sensor 106B.

Site monitor runtime computer 105 and site monitor machine learning computer 300 are both illustrated in FIG. 1 to convey that the site monitor machine learning computer discussed herein may be on a site and may be integrated with object sensors, such as site monitor runtime computer 105, or may be remote from a site and may obtain data from object sensors on the site, such as site monitor machine learning computer 300.

As discussed herein, the site monitor machine learning computer (site monitor runtime computer 105 and or site monitor machine learning computer 300) may execute or perform one or more of object identification neural training module 500, time-series neural training module 600, runtime generation module 700, runtime object identification module 800, runtime object time-series analysis module 900, image stitching module 1200, and visualization module 210. In the examples discussed herein, site monitor runtime computer 105 may execute a subset of these modules, such as runtime object identification module 800 and runtime object time-series analysis module 900.

Physical and logical components of the site monitor machine learning computer may be remote, e.g. may be provided by a network- or other cloud-based resource, and or may be distributed.

The site monitor machine learning computer may execute object identification neural training module 500 to train an object detection neural network ("ODNN") to identify objects in a site, such as construction site 100. Object identification neural training module 500 may be trained to identify objects such as, for example, a carrier, e.g. crane 110, an authorized person, e.g. authorized person 121, a non-authorized person, e.g. non-authorized person 124, a person engaged in a task, e.g. task-person 132, a safety equipment, e.g. visibility safety equipment 122 (e.g. a vest, color, or the like), physical protection safety equipment 123 (e.g. a helmet, pads, gloves, or the like), a site mechanical equipment, a vehicle, e.g. vehicle 130, a site building, e.g. site building 115, a site building material, e.g. site building material 126 (e.g. boards, pipes, sheets of glass, drywall, bags of sand, and the like), and the like.

Site monitor runtime computer 105 may obtain a pre-trained ODNN from or via site monitor machine learning computer 300. Site monitor machine learning computer 300 may aggregate multiple images from multiple sites from multiple instances of site monitor runtime computer 105 to train the ODNN for distribution to multiple instances of site monitor runtime computer 105. In this way, a central or collector instance of object identification neural training module 500 in site monitor machine learning computer 300 may train the ODNN across images from numerous sites.

Site monitor runtime computer 105 may execute runtime object identification module 800 which comprises the ODNN, to identify objects in the site, such as construction site 100. Objects identified by the ODNN in runtime object identification module 800 may comprise, for example, a carrier, a type of carrier, e.g. a crane, a suspended load, an authorized person, a non-authorized person, a safety equipment, a helmet, vest, fence, safety rope, or the like, a site mechanical equipment and or a type of site mechanical equipment, e.g. an SLCS, a vehicle, a saw, a pneumatic equipment, a hammer, a wrench, or the like, a site building, a site building material, and the like.

Output of runtime object identification module 800 may comprise, for example, labeled or categorized images, e.g. a still or video images with highlighting around identified objects and with the categorization associated with the highlighted objects as well as a confidence level of the object and or categorization.

Runtime object identification module 800 may further obtain user feedback, e.g. corrections, in relation to the identified objects and or categorizations thereof. Runtime object identification module 800 may update the categorization according to the user feedback and may store the updated and confirmed object categorizations as training data, to be used by object identification neural training module 500.

Output of runtime object identification module 800 may further comprise non-human readable output which encodes the objects, such as tensors suitable to be provided to another neural network.

Objects and categorizations identified by runtime object identification module 800 or encoded in tensors therefrom may be provided to runtime object time-series analysis module 900. Runtime object time-series analysis module 900 executes a time-series neural network ("TSNN"). The TSNN processes tensors or objects from runtime object identification module 800 and is trained to identify aspects of the objects which require time-series analysis, for example, a site map of the site, wherein the site map identifies where different types of objects move and boundaries thereof.

The TSNN may identify behaviors, including object movements, and object movements that led to or previously preceded contact between objects, injuries or accidents, and the like. E.g. the TSNN may identify hazardous area 145 beneath or adjacent to carrier 110 and suspended load 140, vehicle 130 in hazardous area 145, authorized person 121 in hazardous area 145, an area in front of vehicle 130 when vehicle 130 is moving, and the like.

The TSNN may further identify behaviors of objects. The behavior of the object may comprise, for example, at least one of an object movement, a speed, an object movement preceding contact, an object contact, a crane pick, a hazardous condition, a theft, and an accident. Accidents may comprise, for example, a contact between objects, a contact between objects where at least one object has high potential or kinetic energy, an unexpected contact between objects, an atypical contact between objects, and the like.

The TSNN may be trained to providing the foregoing types of output by time-series neural training module 600. As with the ODNN, one or both site monitor runtime computer 105 and site monitor machine learning computer 300 may execute time-series neural training module 600 to train the TSNN. Site monitor machine learning computer 300 may aggregate multiple objects from multiple sites from multiple instances of site monitor runtime computer 105 and large training data sets to train the TSNN for distribution to multiple instances of site monitor runtime computer 105. Site monitor runtime computer 105 may then obtain a pre-trained TSNN from or via site monitor machine learning computer 300. In this way, a central or collector instance of time-series neural training module 600 may train the TSNN across images or other sensor data from numerous sites. During performance of runtime object time-series analysis module 900, human corrections may be stored and fed back as training data to the TSNN in time-series neural training module 600.

Runtime object time-series analysis module 900 may also determine equipment, vehicle, and personnel utilization, such as a utilization of crane 110, a utilization or consumption rate of materials, such as site building material, a rate of construction of a building, such as site building, and the like.

Runtime object time-series analysis module 900 may identify behaviors such as hazardous conditions, such as hazardous area 145 below suspended load 140 suspended by crane 110, within an area traversed by vehicle 130, and the like. Runtime object time-series analysis module 900 may identify hazardous conditions based training and or based on object motions which preceded accidents, where the accident was either identified to the TSNN and the accident and preceding motions were fed back in training data (as discussed herein) or where the accident was identified by the TSNN and the accident and preceding motions were fed back in training data. Accidents may comprise, for example, a contact between objects, a contact between objects where at least one object had high speed, high potential or kinetic energy, an unexpected contact between objects, an atypical contact between objects, and the like.

As discussed herein, various of the output of runtime object time-series analysis module 900 may trigger an alarm, such as a warning output by warning beacon 135 or other output.

The site monitor machine learning computer may further perform image stitching module 1200, to stitch together multiple images of, for example, site 100, to create composite site image 455. Output of runtime object identification module 800 and or runtime object time-series analysis module 900 and sensor data associated with categories may be combined with or output in relation to an image of site 100, such as a composite image of site 100. Composite images and output are discussed further in relation to image stitching module 1200, visualization module 210, and examples in FIG. 10, FIG. 11, and FIG. 12.

Figure 2:
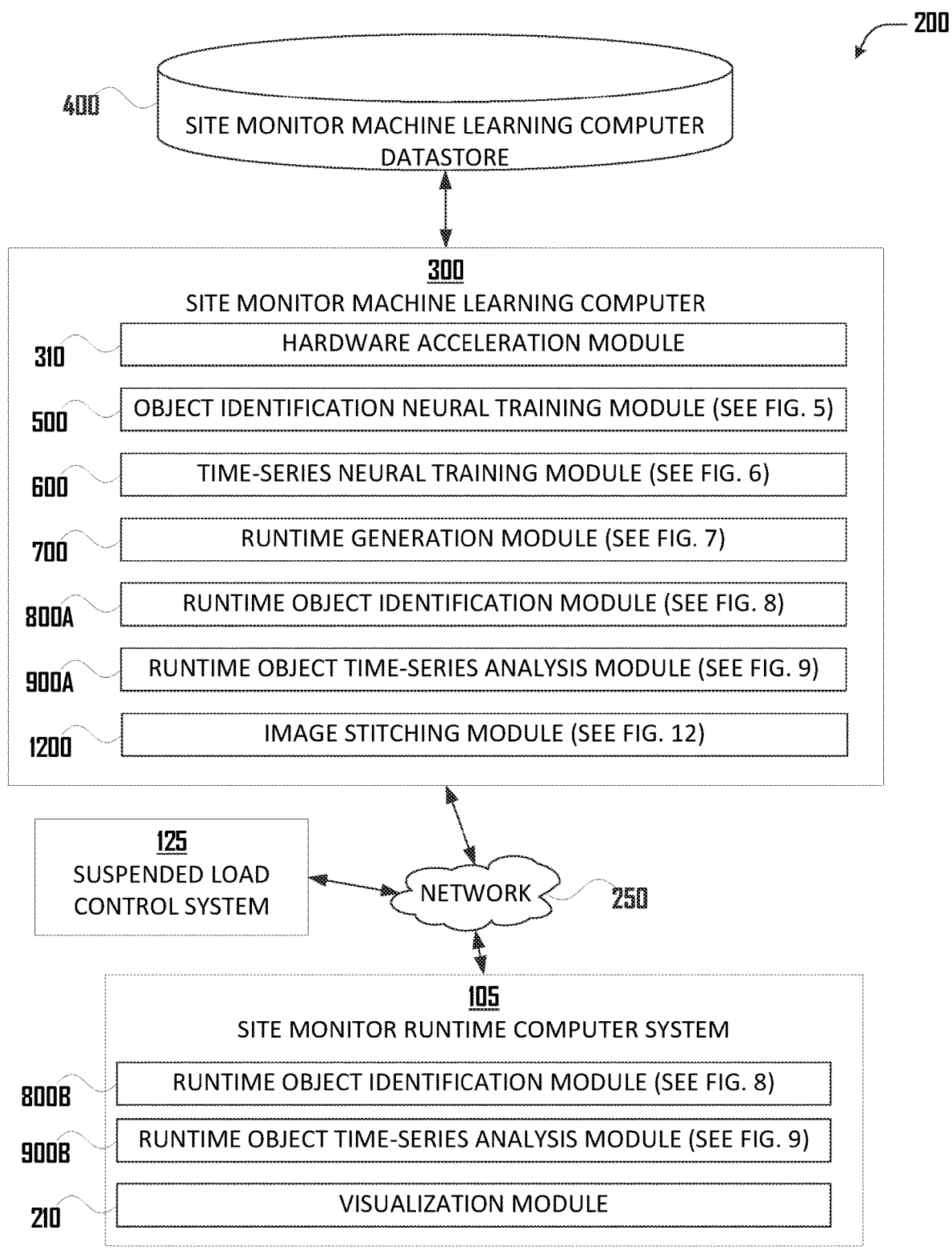
FIG. 2 is a network and device diagram illustrating an example of site monitor machine learning computer, site monitor machine learning computer datastore, a suspended load control system, a site monitor runtime computer system, and a network incorporated with teachings of the present disclosure, according to some embodiments.

FIG. 2 is a network and device diagram illustrating an example of site monitor machine learning computer 300, site monitor machine learning computer datastore 400, suspended load control system 125 ("SLCS 125"), site monitor runtime computer system 105, and network 250 incorporated with teachings of the present disclosure, according to some embodiments. SLCS 125 should be understood as an example of an object sensor.

Site monitor machine learning computer 300 is illustrated as connecting to site monitor machine learning computer datastore 400. Site monitor machine learning computer datastore 400 is described further, herein, though, generally, should be understood as a datastore used by site monitor machine learning computer 300.

Network 250 may comprise computers, network connections among the computers, and software routines to enable communication between the computers over the network connections. Examples of Network 250 comprise an Ethernet network, the Internet, and/or a wireless network, such as a GSM, TDMA, CDMA, EDGE, HSPA, LTE, satellite network, or other network provided by a wireless service provider. Connection to Network 250 may be via a Wi-Fi connection. More than one network may be involved in a communication session between the illustrated devices. Connection to Network 250 may require that the computers execute software routines which enable, for example, the seven layers of the OSI model of computer networking or equivalent in a wireless phone network.

Figure 3:
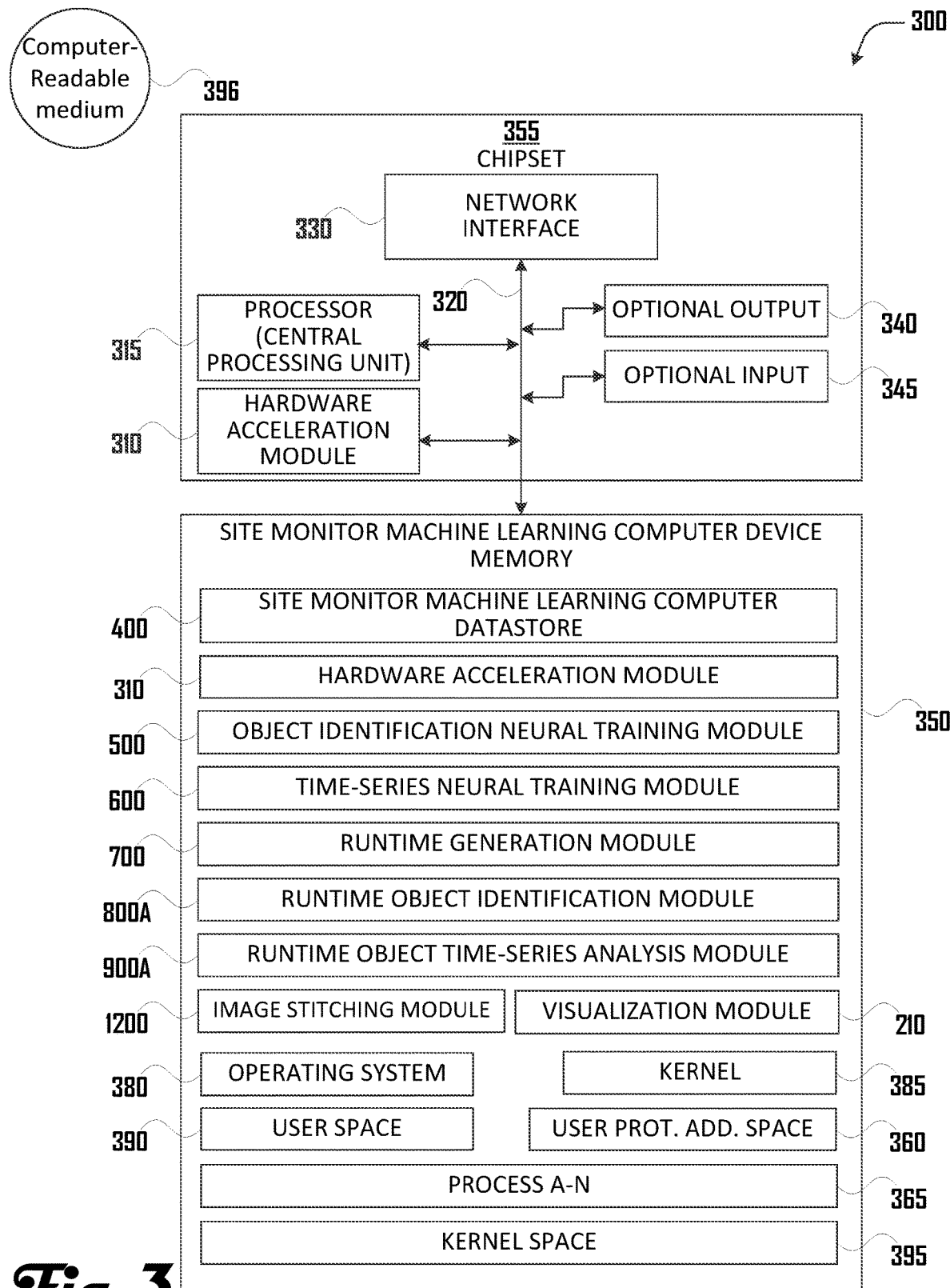
FIG. 3 is a functional block diagram illustrating an example of the site monitor machine learning computer of FIG. 2, incorporated with teachings of the present disclosure, according to some embodiments.

FIG. 3 is a functional block diagram illustrating an example of site monitor machine learning computer 300, incorporated with teachings of the present disclosure, according to some embodiments. Site monitor machine learning computer 300 may include chipset 355. Chipset 355 may include processor 315, input/output (I/O) port(s) and peripheral devices, such as output 340 and input 345, and network interface 330, and computer device memory 350, all interconnected via bus 320. Network interface 330 may be utilized to form connections with network 250, with site monitor machine learning computer datastore 400, or to form device-to-device connections with other computers.

Chipset 355 may include communication components and/or paths, e.g., buses 320, that couple processor 315 to peripheral devices, such as, for example, output 340 and input 345, which may be connected via I/O ports. Processor 315 may include one or more execution cores (CPUs). For example, chipset 355 may also include a peripheral controller hub (PCH) (not shown). In another example, chipset 355 may also include a sensors hub (not shown). Input 345 and output 340 may include, for example, user interface device (s) including a display, a touch-screen display, printer, keypad, keyboard, etc., sensor(s) including accelerometer, global positioning system (GPS), gyroscope, etc., communication logic, wired and/or wireless, storage device(s) including hard disk drives, solid-state drives, removable storage media, etc. I/O ports for input 345 and output 340 may be configured to transmit and/or receive commands and/or data according to one or more communications protocols. For example, one or more of the I/O ports may comply and/or be compatible with a universal serial bus (USB) protocol, peripheral component interconnect (PCI) protocol (e.g., PCI express (PCIe)), or the like.

Hardware acceleration module 310 may provide hardware acceleration of various functions otherwise performed by object identification neural training module 500, time-series neural training module 600, runtime generation module 700, runtime object identification module 800, runtime object time-series analysis module 900, image stitching module 1200, and visualization module 210. Hardware acceleration module may be provided by, for example, Integrated Performance Primitives software library by Intel Corporation, as may be executed by an Intel (or other compatible) chip, and which may implement, for example, a library of programming functions involved with real time computer vision and machine learning systems. Such a library includes, for example, OpenCV. OpenCV includes, for example, application areas including 2D and 3D feature toolkits, egomotion estimation, facial recognition, gesture recognition, human-computer interaction, mobile robotics, motion understanding, object identification, segmentation and recognition, stereopsis stereo vision (including depth perception from two cameras), structure from motion, motion tracking, and augmented reality. OpenCV also includes a statistical machine learning library including boosting, decision tree learning, gradient boosting trees, expectation-maximization algorithms, k-nearest neighbor algorithm, naïve Bayes classifier, artificial neural networks, random forest, and a support vector machine.

Hardware acceleration module may be provided by, for example, NVIDIA® CUDA-X libraries, tools, and technologies built on NVIDIA CUDA® technologies. Such libraries may comprise, for example, math libraries, parallel algorithms, image and video libraries, communication libraries, deep learning libraries, and partner libraries. Math libraries may comprise, for example, a GPU-accelerated basic linear algebra (BLAS) library, a GPU-accelerated library for Fast Fourier Transforms, a GPU-accelerated standard mathematical function library, a GPU-accelerated random number generation (RNG), GPU-accelerated dense and sparse direct solvers, GPU-accelerated BLAS for sparse matrices, a GPU-accelerated tensor linear algebra library, and a GPU-accelerated linear solvers for simulations and implicit unstructured methods. Parallel algorithm libraries may comprise, for example a GPU-accelerated library of C++ parallel algorithms and data structures. Image and video libraries may comprise, for example, a GPU-accelerated library for JPEG decoding, GPU-accelerated image, video, and signal processing functions, a set of APIs, samples, and documentation for hardware accelerated video encode and decode on various operating systems, and a software developer kit which exposes hardware capability of NVIDIA TURING™ GPUs dedicated to computing relative motion of pixels between images. Communication libraries may comprise a standard for GPU memory, with extensions for improved performance on GPUs, an open-source library for fast multi-GPU, multi-node communications that maximize bandwidth while maintaining low latency. Deep learning libraries may comprise, for example, a GPU-accelerated library of primitives for deep neural networks, a deep learning inference optimizer and runtime for product deployment, a real-time streaming analytics toolkit for AI-based video understanding and multi-sensor processing, and an open-source library for decoding and augmenting images and videos to accelerate deep learning applications. Partner libraries may comprise, for example, OpenCV, FFmpeg, ArrayFire, Magma, IMSL Fortan Numerical Library, Gunrock, Cholmod, Triton Ocean SDK, CUVIlib, and others.

In embodiments, hardware acceleration module 310 may be or comprise a programmed field programmable gate array ("FPGA"), i.e., a FPGA comprising gate arrays configured with a bit stream to embody the logic of the hardware accelerated function (equivalent to the logic provided by the executable instructions of a software embodiment of the function). In embodiments, hardware acceleration module 310 may also or alternatively include components of or supporting computer device memory 350.

Computer device memory 350 may generally comprise a random-access memory ("RAM"), a read only memory ("ROM"), and a permanent mass storage device, such as a disk drive or SDRAM (synchronous dynamic random-access memory). Computer device memory 350 may store program code for modules and/or software routines, such as, for example, hardware acceleration module 310, object identification neural training module 500, time-series neural training module 600, runtime generation module 700, runtime object identification module 800, runtime object time-series analysis module 900, image stitching module 1200 and visualization module 210.

Computer device memory 350 may also store operating system 380. These software components may be loaded from a non-transient computer readable storage medium 396 into computer device memory 350 using a drive mechanism associated with a non-transient computer readable storage medium 396, such as a floppy disc, tape, DVD/CD-ROM drive, memory card, or other like storage medium. In some embodiments, software components may also or instead be loaded via a mechanism other than a drive mechanism and computer readable storage medium 396 (e.g., via network interface 330).

Figure 4:
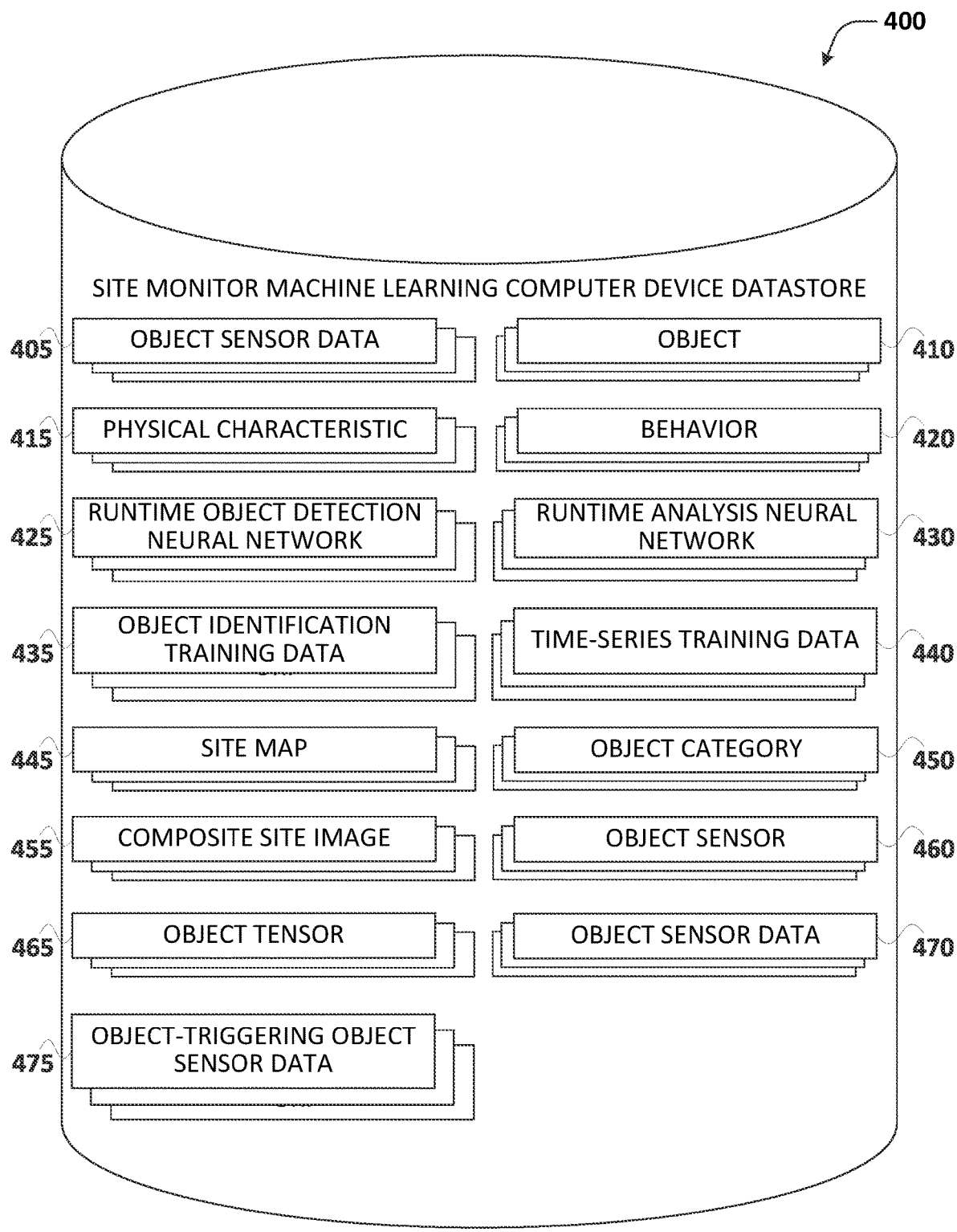
FIG. 4 is a functional block diagram illustrating an example of the site monitor machine learning computer datastore incorporated with teachings of the present disclosure, consistent with embodiments of the present disclosure.

Computer device memory 350 is also illustrated as comprising kernel 385, kernel space 395, user space 390, user protected address space 360, and site monitor machine learning computer datastore 400 (illustrated and discussed further in relation to FIG. 4).

Computer device memory 350 may store one or more process 365 (i.e., executing software application(s)). Process 365 may be stored in user space 390. Process 365 may include one or more other process 365a . . . 365n. One or more process 365 may execute generally in parallel, i.e., as a plurality of processes and/or a plurality of threads.

Computer device memory 350 is further illustrated as storing operating system 380 and/or kernel 385. The operating system 380 and/or kernel 385 may be stored in kernel space 395. In some embodiments, operating system 380 may include kernel 385. Operating system 380 and/or kernel 385 may attempt to protect kernel space 395 and prevent access by certain of process 365a . . . 365n.

Kernel 385 may be configured to provide an interface between user processes and circuitry associated with site monitor machine learning computer 300. In other words, kernel 385 may be configured to manage access to processor 315, chipset 355, I/O ports and peripheral devices by process 365. Kernel 385 may include one or more drivers configured to manage and/or communicate with elements of site monitor machine learning computer 300 (i.e., processor 315, chipset 355, I/O ports and peripheral devices).

Site monitor machine learning computer 300 may also comprise or communicate via bus 320 and/or network interface 330 with site monitor machine learning computer datastore 400, illustrated and discussed further in relation to FIG. 4. In various embodiments, bus 320 may comprise a high-speed serial bus, and network interface 330 may be coupled to a storage area network ("SAN"), a high speed wired or wireless network, and/or via other suitable communication technology. Site monitor machine learning computer 300 may, in some embodiments, include many more components than as illustrated. However, it is not necessary that all components be shown in order to disclose an illustrative embodiment.

FIG. 4 is a functional block diagram of the site monitor machine learning computer datastore 400 illustrated in site monitor machine learning computer 300 of FIG. 3, according to some embodiments. The components of site monitor machine learning computer datastore 400 may include data groups used by modules and/or routines, e.g., object sensor data 405 (e.g an image, state and parameter information from an SLCS, and the like), object 410, physical characteristic 415, behavior 420, runtime object detection neural network 425, runtime time-series analysis neural network 430, object identification training data 435, time-series training data 440, site map 445, object category 450, composite site image 455, object sensor 460, object tensor 465, and object-triggering object sensor data 475. The data groups used by modules or routines illustrated in FIG. 4 may be represented by a cell in a column or a value separated from other values in a defined structure in a digital document or file, including in a neural network. Though referred to herein as individual records or entries, the records may comprise more than one database entry. The database entries may be, represent, or encode numbers, numerical operators, binary values, logical values, text, string operators, references to other database entries, joins, conditional logic, tests, and similar.

The components of site monitor machine learning computer datastore 400 are discussed further herein in the discussion of other of the Figures.

Figure 5:
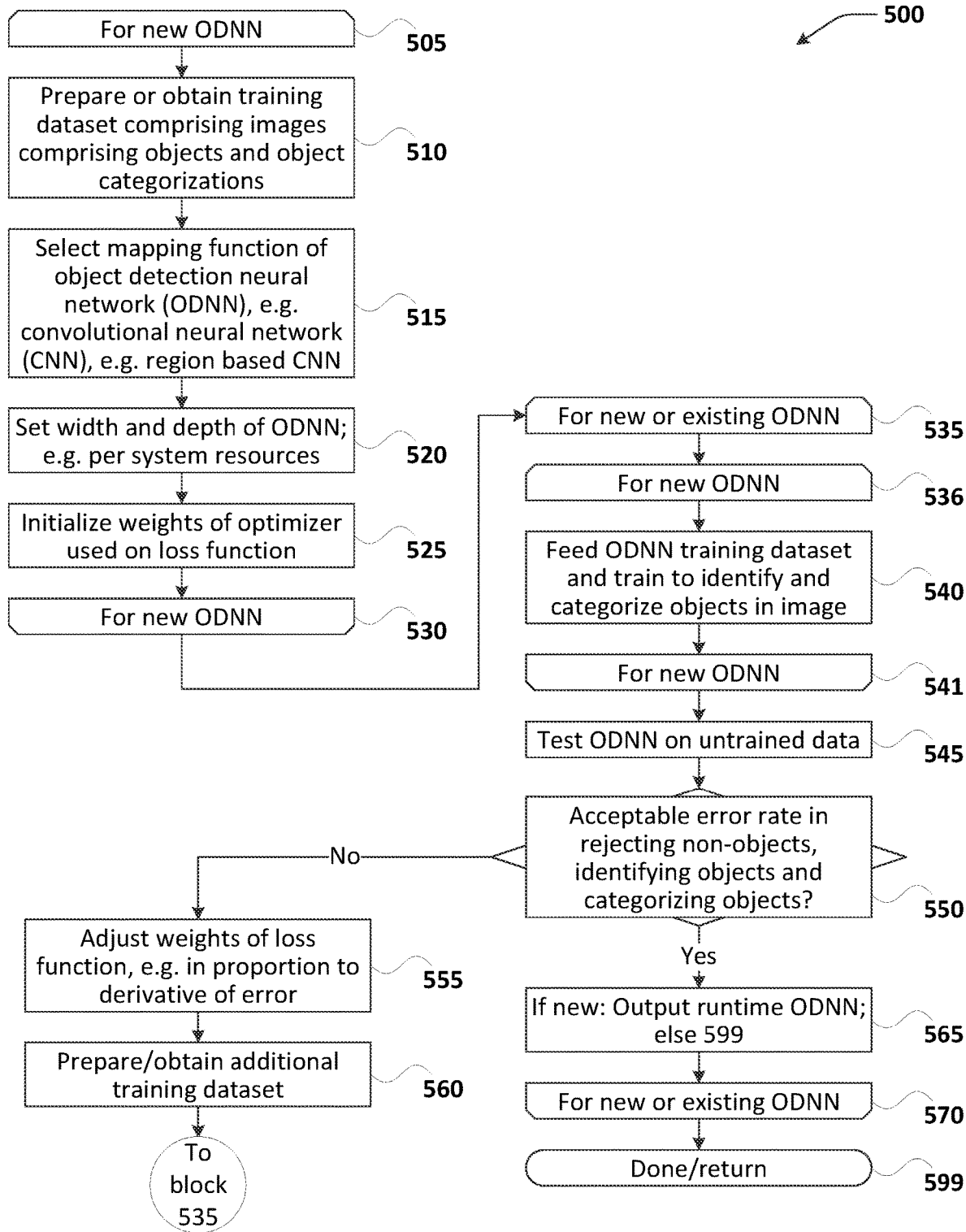
FIG. 5 is a flow diagram illustrating an example of a method performed by an object identification neural training module, according to some embodiments.

FIG. 5 is a flow diagram illustrating an example of a method performed by object identification neural training module 500, incorporated with teachings of the present disclosure, according to some embodiments. This module may be performed by or with the assistance of a hardware accelerator, such as hardware acceleration module 310. This module may be performed by, for example, one or both site monitor runtime computer 105 and or site monitor machine learning computer 300.

Opening loop block 505 to closing loop block 530 may iterate over one or more new object detection neural networks ("ODNNs"), such as a first time an ODNN is trained.

At block 510, object identification neural training module 500 may obtain a training dataset. The training dataset may comprise object sensor data, e.g. images, wherein objects are identified in the object sensor data and wherein the objects have been labeled or categorized. The training dataset may be obtained from, for example, one or more object identification training data 435 records. The training data set may be prepared from user feedback, e.g. from block 825, At block 515, object identification neural training module 500 may select mapping function(s) of an object detection neural network ("ODNN"), e.g. of a convolutional neural network ("CNN"), e.g. a region-based CNN.

At block 520, object identification neural training module 500 may set a scale of ODNN, wherein the scale may comprise depth, width, and resolution. Depth may comprise, for example, a number of convolutional layers in the ODNN. Width may comprise, for example, a number of channels in each convolutional layer in the ODNN. Resolution may comprise, for example, the resolution of images passed to the ODNN. Width, depth, and or resolution may be set based on computer resources, such as resources in site monitor runtime computer system 105.

At block 525, object identification neural training module 500 may initialize weights of an optimizer used on a loss function of the ODNN. The weights may be initialized at, for example, small random values. The loss function measures a discrepancy between a target output and computed output. For classification purposes, a loss function such as categorical cross entropy may be used.

At return block 530, object identification neural training module 500 may return to opening loop block 505 to iterate over addition new ODNNs, if any.

Opening loop block 535 to closing loop block 570 may iterate over new or existing ODNN.

Opening loop block 536 to closing loop block 541 may process over a new ODNN.

At block 540, object identification neural training module 500 may provide the ODNN with a portion of the training dataset of block 510 and train the ODNN to identify objects in images and to categorize or label the objects. During this block, object identification neural training module 500 may optimize the weights of filters applied to the loss function, such as through back propagation.

At block 545, object identification neural training module 500 may test the ODNN on untrained training data, e.g. on a portion of the training dataset of block 510 not previously provided during training at block 540, to determine whether the ODNN is returning acceptable results.

At decision block 550, object identification neural training module 500 may determine whether the ODNN produces an acceptable error rate in rejecting objects the ODNN has not been trained to categorize or label and in identification and categorization of objects the ODNN has been trained to identify and categorize. An acceptable error rate may be, for example, less than ten percent.

If negative or equivalent at decision block 550, at block 555, object identification neural training module 500 may adjust weights of the optimizer used on the loss function. Adjustment of weights may be, for example, in proportion to a derivative of error. If necessary or desirable, the scale of the CNN may also be adjusted.

At block 560, object identification neural training module 500 may prepare or obtain an additional training set data and may return to block 535.

At block 565, which may follow decision block 550 following an affirmative or equivalent decision, object identification neural training module 500 may output a runtime object detection neural network. The output runtime object detection neural network may be stored as, for example, one or more runtime object detection neural network 425 records.

At block 599, object identification neural training module 500 may conclude and/or return to a module and/or another process which may have called it.

Figure 6:
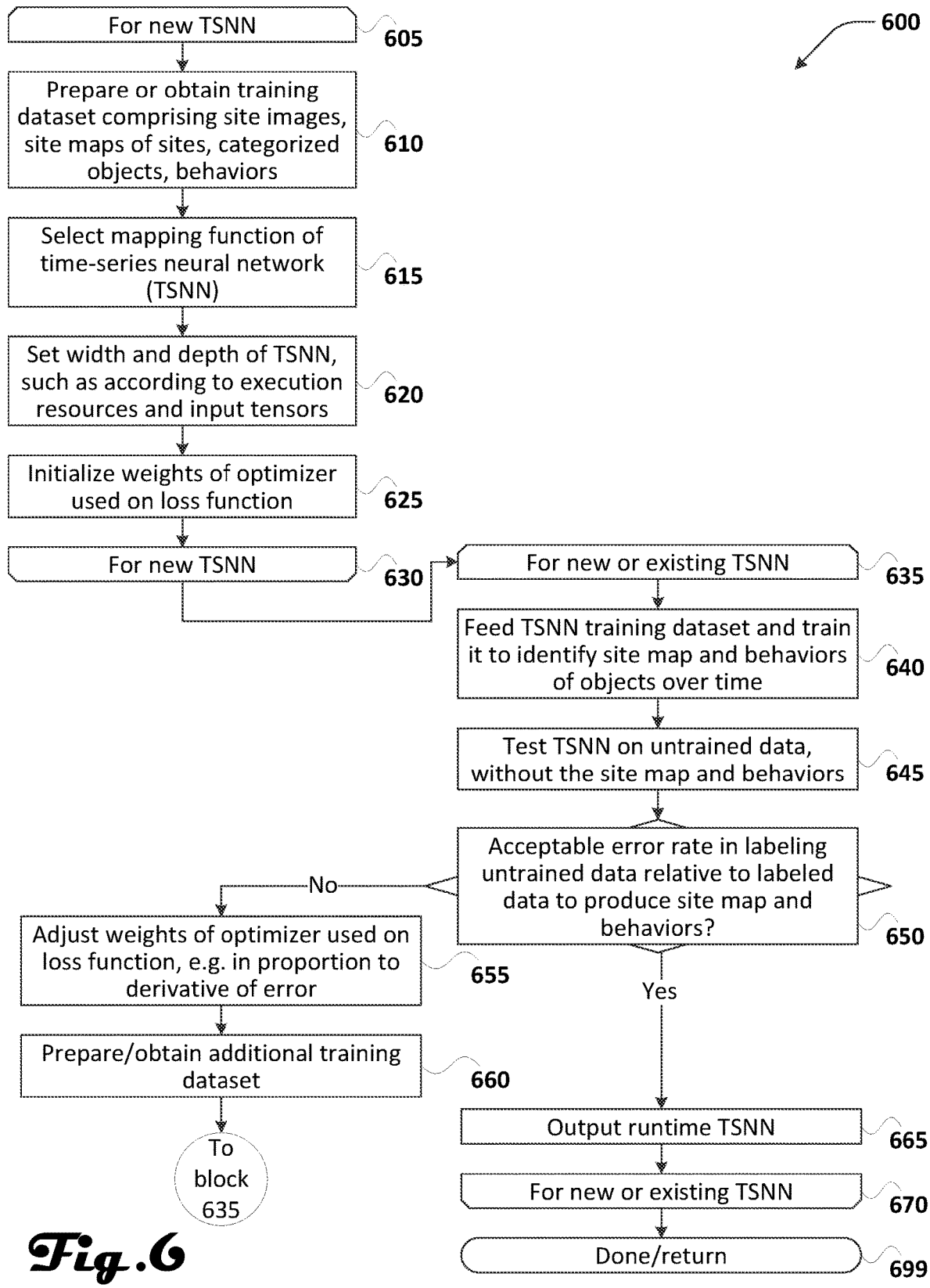
FIG. 6 is a flow diagram illustrating an example of a method performed by a time-series neural training module, according to some embodiments.

FIG. 6 is a flow diagram illustrating an example of a method performed by time-series neural training module 600, incorporated with teachings of the present disclosure, according to some embodiments. This module may be performed by or with the assistance of a hardware accelerator, such as hardware acceleration module 310. This module may be performed by, for example, one or both site monitor runtime computer 105 and or site monitor machine learning computer 300.

Opening loop block 605 to closing loop block 630 may iterate over one or more new TSNNs.

At block 610, time-series neural training module 600 may obtain a first set of training data comprising object sensor data, e.g. images of a site, a site map of the site, objects identified in the object sensor data, e.g. objects identified in images of the site, categories of objects identified in the object sensor data, and behaviors of the objects. Some or all of this training data may be encoded in tensors.

The training data set may be obtained from one or more time-series training data 440 records. The time-series training data 440 records may comprise tensors of size (s×b×t), where "s" is the number of parameters used for training, "b" is the batch size that determines how many time steps are included as a labeled chunk of data, and "t" is the number of batch instances contained in the training matrix. The label data may comprise a vector of length "t", such that every training batch that is an (s×b) matrix is labelled as one or more of a single site map, object, object category, behavior, and the like.

At block 615, time-series neural training module 600 may select a mapping function of a neural network, such as a neural network which performs well with analysis of time-series data, e.g. a recurrent neural network, e.g. a long short-term memory architecture recurrent neural network ("LSTM RNN"). The LSTM RNN may comprise, for example, a cell, an input gate, an output gate, and a forget gate.

At block 620, time-series neural training module 600 may scale the LSTM RNN. The scale may comprise a depth and a width. The depth may comprise a number of layers. The width may comprise a number of channels in each layer. Scaling may be at least partially according to runtime execution resources, e.g. in site monitor runtime computer system 105. Scaling may also be according to computer processing requirements presented by tensors input into runtime object time-series analysis module 900 by runtime object identification module 800.

At block 625, time-series neural training module 600 may initialize weights of an optimizer, e.g. of a gradient-based optimizer, used on a loss function of the LSTM RNN. The weights may be initialized at, for example, small random values.

At closing loop block 630, time-series neural training module 600 may return to opening loop block 605 to iterate over any other new TSNNs, if any.

Opening loop block 635 to closing loop block 670 may iterate over new or existing TSNN instances.

At block 640, time-series neural training module 600 may feed the LSTM RNN a portion of the training data set of block 610, training the LSTM RNN to prepare a site map of a site and to identify behaviors of the objects over time.

At block 645, time-series neural training module 600 may test the LSTM RNN on untrained training data, e.g. on a portion of the training dataset of block 610 not provided during training at block 640, to determine whether the LSTM RNN is returning acceptable results. During this test, the previously not provided portion of the training data of block 610 may be provided without the site map and behaviors which may be used during training in block 640 and which may have been present in the training data. The site map and behaviors may be used to test the results of the LSTM RNN on the untrained training data.

At decision block 650, time-series neural training module 600 may determine whether the LSTM RNN produces an acceptable error rate in labeling the time-series object data relative to untrained training data of block 645. For example, is the LSTM RNN producing a site map and behaviors within an acceptable error rate or margin, relative to the site map and behaviors in the original training data of block 610.

If negative or equivalent at decision block 650, at block 655, time-series neural training module 600 may adjust weights of the optimizer used on the loss function. Adjustment of weights may be, for example, in proportion to a derivative of error. If necessary or desirable, the scale of the LSTM RNN may also be adjusted.

At block 660, time-series neural training module 600 may prepare or obtain additional training set data and may then return to block 635.

At block 665, which may follow decision block 650 following an affirmative or equivalent decision, time-series neural training module 600 may output a runtime time-series neural network. The output runtime time-series neural network may be stored as, for example, one or more runtime time-series analysis neural network 430 records. The runtime time-series analysis neural network 430 record may be used in, for example, runtime object time-series analysis module 900.

At block 699, time-series neural training module 600 may conclude and/or return to a module and/or another process which may have called it.

Figure 7:
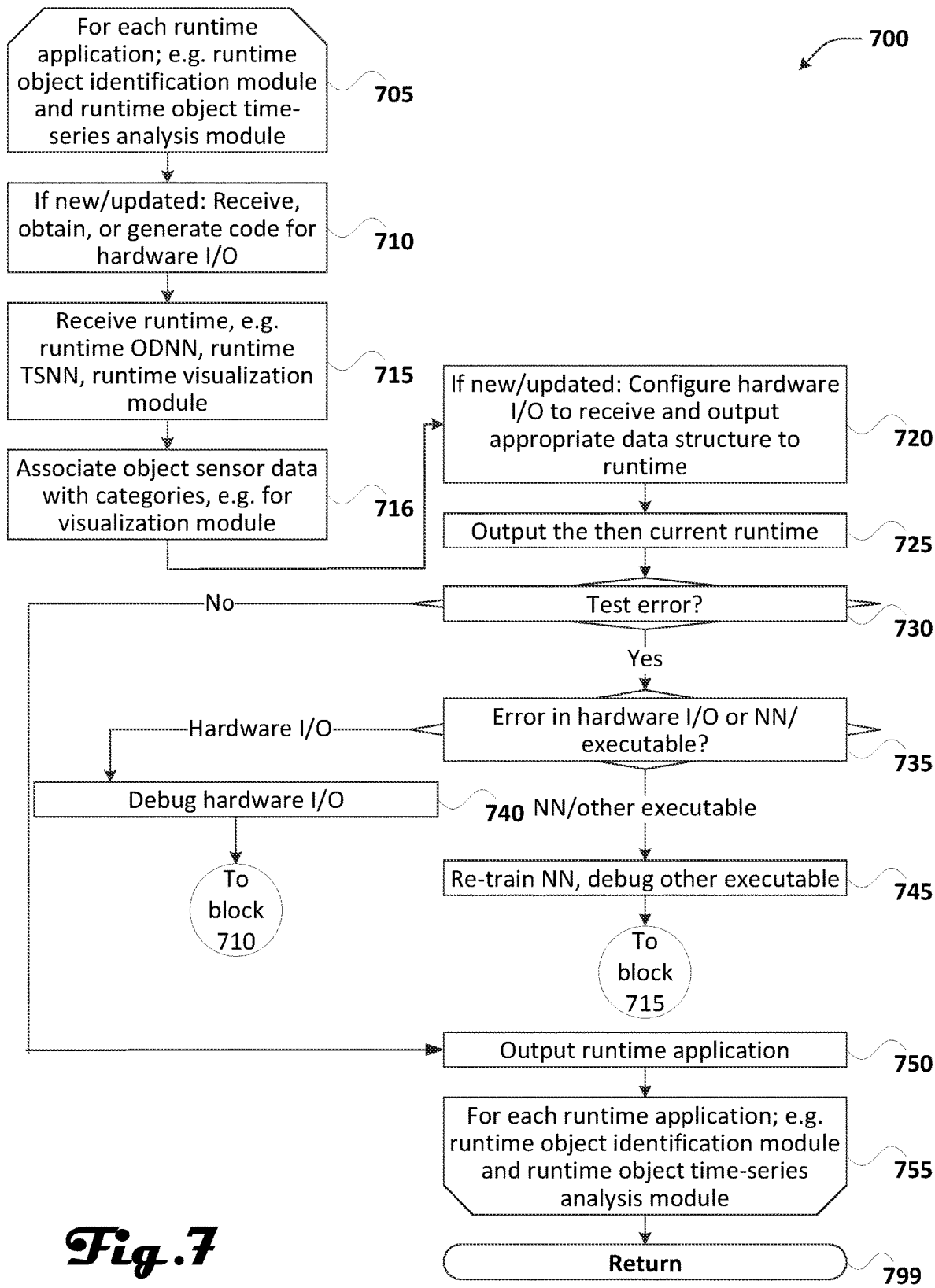
FIG. 7 is a flow diagram illustrating an example of a method performed by a runtime generation module, according to some embodiments.

FIG. 7 is a flow diagram illustrating an example of a method performed by runtime generation module 700, incorporated with teachings of the present disclosure, according to some embodiments. This module may be performed by or with the assistance of a hardware accelerator, such as hardware acceleration module 310. This module may be performed by, for example, one or both site monitor runtime computer 105 and or site monitor machine learning computer 300.

Opening loop block 705 to closing loop block 755 may iterate over runtime applications to be generated by runtime generation module 700, e.g. runtime object identification module 800 and or runtime object time-series analysis module 900.

At block 710, runtime generation module 700 may receive, obtain, or generate code for a hardware interface or input/output. The hardware interface may allow hardware for a runtime execution computer to interface with one or more humans, to interface with processes, and to interface with hardware input and output devices.

The hardware interfaces prepared or obtained by runtime generation module 700 may allow site monitor runtime computer system 105 and modules performed by site monitor runtime computer system 105, e.g. runtime object identification module 800 and runtime object time-series analysis module 900, to interface with one or more humans, to interface with other processes, and to interface with hardware input and output devices.

For example, the hardware interface prepared or obtained by runtime generation module 700 may allow runtime object identification module 800 to obtain sensor data, e.g. images (digital photographs), or a sequence of images, e.g. video, from a camera in or of site monitor runtime computer system 105, so that runtime object identification module 800 can process the images with the ODNN, identify or categorize objects in the images, output objects, object categories, and confidence levels in both a computer-readable format, e.g. as object tensor 465 records, as well as in a human-readable format, e.g. as object sensor data 405 records, e.g. comprising images input to runtime object identification module 800. The human-readable format may further comprise object-triggering object sensor data 475 records, which records identify portions of object sensor data which triggered identification and or categorization of an object, object category 450 records, and the like. The hardware interface may further allow runtime object identification module 800 to receive human corrections in relation to identification of objects, categorization of objects, and the like, such as in a human interface, as may be generated, for example, by visualization module 210.

For example, the hardware interface prepared or obtained by runtime generation module 700 may allow may allow runtime object time-series analysis module 900 to obtain time-series object data from, for example, runtime object identification module 800, including in the format of object tensor 465 records, so that runtime object time-series analysis module 900 may process such object tensor 465 records with runtime time-series analysis neural network 430, determine a site map and behaviors of objects, and output the results thereof to other processes as well as to human users, e.g. for human confirmation and otherwise for use by humans. For example, output may be configured to allow visualization module 210 to create user interface 1100, to allow warning systems, such as warning beacon 135, to issue warnings in response to behaviors which trigger warnings.

The hardware interface may be with respect to a human-computer interface, such as a tablet computer, a laptop, or the like; the hardware interface for the human-computer interface may comprise audio, visual, keyboard, and tactile input by the human and output to the human. The hardware interface for the human-computer interface further allow human input into modules of site monitor runtime computer system 105, such as into visualization module 210, to allow human review of output of and corrections to the interpretation of the time-series analysis of the object data relative to the site map, behaviors, and the like.

At block 715, runtime generation module 700 may obtain or receive a runtime submodules to be used in the then-current module to be generated. For example, runtime generation module 700 may obtain an executable neural network to be used in the then-current runtime application being prepared. For example, if preparing runtime object identification module 800, runtime generation module 700 may obtain or receive runtime object detection neural network 425. For example, if preparing runtime object time-series analysis module 900, runtime generation module 700 may obtain or receive runtime time-series analysis neural network 430. For example, runtime generation module 700 may obtain executable code for visualization module 210, wherein the visualization module 210 is to output, for example, user interface 1100.

At block 716, runtime generation module 700 may associate object sensor data with categories. This may be performed, for example, for visualization module 210, if this was not performed during preparation of visualization module 210, so that object sensor data 405 records may be associated with categories and values thereof may be output in a user interface, when objects with the associated categories appear in the user interface.

An example of this is discussed in relation to user interface 1100. As noted herein, in embodiments, the object sensor data may measure information of or related to an object, such as electromagnetic radiation reflected or emitted by the object, a sound or decibel level, an acceleration, a voltage, an amperage, a mass or weight, a position or location, a size, a relative position, a density, a distance, a fluid level, a pH, a speed, an orientation, an atmospheric pressure, a pressure on or of a component, a magnetic field, an electrical field, a temperature, a wind speed, and the like. As noted herein, in embodiments, the object sensor data may be state and parameter information from an SLCS. The object sensor data may have been collected at a same time as when data underlying or leading to production of the object tensors was collected. If not already performed, object sensor data 405 records may be associated with one or more object categories by runtime generation module 700. For example, state and parameter information from an SLCS may be associated with one or more of a category, e.g. a category of SLCS, suspended load, carrier, or the like. As discussed in relation to user interface 1100 and visualization module 210, when an SLCS appears in video in user interface 1100, and when such SLCS is also labeled with an "SLCS" category by the ODNN, object sensor data from the SLCS may be output to the user interface, so as to allow the user to see the object sensor data from the SLCS when the SLCS is in the video in the user interface. This association between object sensor data and categories is different from association between object 410 records and object category 450 records produced by the ODNN because the former is an association made by human judgment, ultimately expressed in a programmed association without a confidence level, whereas the later association is made by the ODNN, with a confidence level.

At block 720, runtime generation module 700 may configure the hardware interface to receive and output appropriate data structure(s) with respect to the hardware execution computer system environment, e.g. for site monitor runtime computer system 105 or site monitor runtime computer system 300, and for the runtime of block 715.

At block 725, runtime generation module 700 may output the then-current runtime application.

At decision block 730, runtime generation module 700 may test the then-current runtime application, such as in an emulator of the runtime hardware, such as an emulator of site monitor runtime computer system 105 and determine whether an error has occurred.

If affirmative or equivalent at decision block 730, at decision block 735, runtime generation module 700 may determine whether the error was an error in the hardware I/O or in the executable, such as in a neural network.

If in the hardware I/O or equivalent at decision block 735, then at block 740 runtime generation module 700 may debug or have the hardware I/O debugged. Following block 740, runtime generation module 700 may return to block 710.

If in the neural network or other executable at decision block 735, then at block 745 runtime generation module 700 may retrain the neural network, such as by calling time-series neural training module 600, or may send the other executable to be debugged. Following block 745, runtime generation module 700 may return to, for example, block 715.

If negative or equivalent at decision block 730, at block 750 runtime generation module 700 may output the then-current runtime application, such as runtime object identification module 800, runtime object time-series analysis module 900, or visualization module 210. In embodiments, runtime generation module 700 may output the runtime application with the neural network as a separate module, e.g. as one or more runtime object detection neural network 425 records or runtime time-series analysis neural network 430 records, which may be updated or upgraded separately from the runtime application.

At block 799, runtime generation module 700 may conclude and/or return to a module and/or another process which may have called it.

Figure 8:
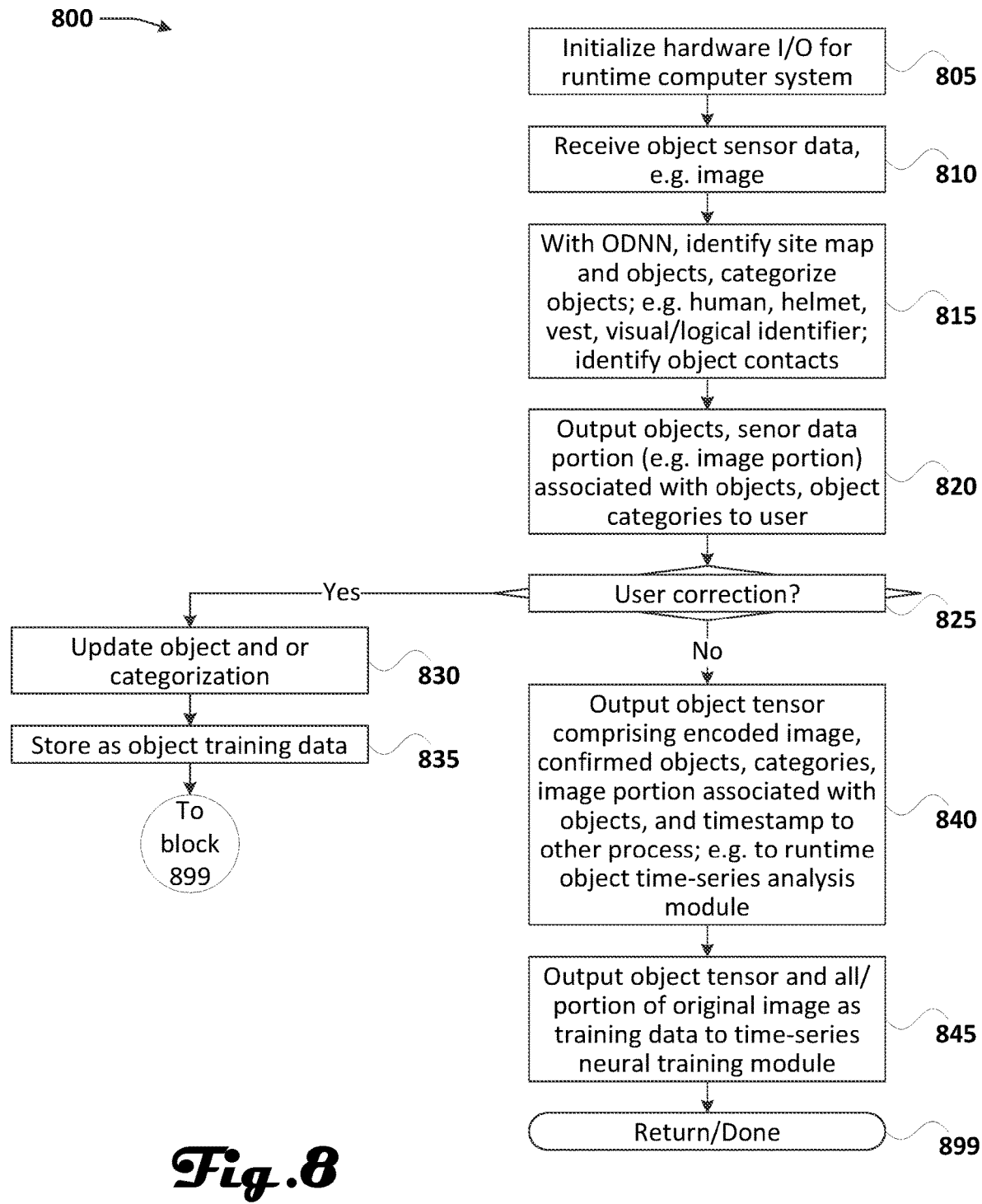
FIG. 8 is a flow diagram illustrating an example of a method performed by a runtime object identification module, according to some embodiments.

FIG. 8 is a flow diagram illustrating an example of a method performed by runtime object identification module 800, incorporated with teachings of the present disclosure, according to some embodiments. Runtime object identification module 800 may be performed by or with the assistance of a hardware accelerator, such as hardware acceleration module 310. This module may be performed by, for example, site monitor runtime computer system 105 which, as noted, may be similar to site monitor machine learning computer 300.

At block 805, runtime object identification module 800 may initialize a hardware I/O for, for example, site monitor runtime computer system 105, connecting input and output for the computer system with modules of the computer system.

At block 810, runtime object identification module 800 may receive one or more object sensor data, wherein the object sensor data may comprise objects, e.g. an image of a site captured by a camera of site monitor runtime computer system 105 which may comprise objects such as suspended load control systems, suspended loads, vehicles, buildings, carriers, cranes, construction materials, people, authorization indicia such as helmets or vests with a color, code, or the like.

At block 815, with an object detection neural network, such as runtime object detection neural network 425, runtime object identification module 800 may identify objects in the object sensor data. Furthermore, in block 815, object identification module 800 may determine one or more categories associated with the identified objects.

Furthermore, in block 815, object identification module 800 may determine a confidence level of one or both of the identified object and or the category. One or more of objects may be stored by runtime object identification module 800 in, for example, one or more object 410 records. One or more of categories may be stored by runtime object identification module 800 in, for example, one or more object category 450 records.

At block 820, runtime object identification module 800 may output objects, object categories, and sensor data portions, e.g. image portions, associated with the objects, potentially with a timestamp, to a user or other process. As discussed herein, identified objects may be saved as, for example, one or more object 410 record. Object 410 records may comprise a weight, strength, or other indicator of confidence ("confidence level") regarding identification of the object 410. Multiple, including multiple overlapping, objects may be identified in object sensor data processed by the ODNN performed by runtime object identification module 800 (e.g by runtime object detection neural network 425 record). Object categories may be stored in, for example, one or more object category 450 record. More than one object category may be output per object 410. Object categories may further comprise a confidence level associated with the object category. Examples of categorizations of objects may comprise a carrier, a type of carrier, e.g. a crane, a suspended load carried by a crane, a person, an authorized person, a non-authorized person, a safety equipment, e.g. a helmet, vest, fence, safety rope, or the like, a site mechanical equipment and or a type of site mechanical equipment, e.g. an SLCS, a vehicle, a saw, a pneumatic equipment, a hammer, a wrench, or the like, a site building, a site building material, contacting objects, other objects found on sites over time which the ODNN may be trained to recognize and categorize. The output of block 820 may further comprise identification of what portion of the input object sensor data triggered identification of object 410. E.g. portions of images which prompted the ODNN to identify the object and object category. Such portion of the object sensor data may be stored as, for example, one or more object-triggering object sensor data 475 record. Such output may comprise or make possible identification of the object in the original source object sensor data; e.g. such output may comprise an original image with identified objects highlighted or otherwise identified in the image.

The output of block 820 may be provided to a user of site monitor machine learning computer for confirmation or correction or to another human for confirmation or correction, such as a human user of a "captcha" system, to a human via, for example, the AMAZON MECHANICAL TURK or MTURK operated by Amazon Mechanical Turk, Inc., or the like.

In decision block 825, runtime object identification module 800 may determine whether a user, human, or a process has provided a correction to an identification of an object or a categorization thereof.

If affirmative or equivalent at decision block 825, at block 830 runtime object identification module 800 may update the object and or object categorization based on the user correction. For example, the user may identify that the image portion associated with the object is not correct, e.g., is not an object and or the user may be given the opportunity to deselect portions and or select portions of the underlying image to identify as an object. For example, the user may identify that one or more category assigned to an identified object is(are) not correct, and may provide a preferred category.

At block 835, runtime object identification module 800 may store the updated object sensor data, sensor data portion, and object categories in one or more object identification training data 435 records. For example, the training data may be used to train the ODNN used in runtime object identification module 800 and to generate a new runtime object detection neural network 425 record.

At block 840, runtime object identification module 800 may output one or more object tensors, e.g. as one or more object tensor 465 record, wherein the object tensor 465 record encodes the object sensor data, e.g. image, confirmed objects, confirmed categories, object sensor data portion associated with objects, e.g. image portion or object-triggering object sensor data 475 record, and confidence level to be used by another process, e.g. by runtime object time-series analysis module 900.

At block 845, runtime object identification module 800 may output confirmed or non-corrected object sensor data, e.g. image, confirmed objects, confirmed categories, object sensor data portion associated with objects, e.g. image portion, and categories in one or more object identification training data 435 records. For example, the training data may be used to train the ODNN. This output may be in the form of one or both of original image or original object sensor data 405 as well as in the form of object tensor 465 records associated with the original image or original object sensor data 405.

At block 899, runtime object identification module 800 may conclude and or return to a module and/or another process which may have called it.

Figure 9:
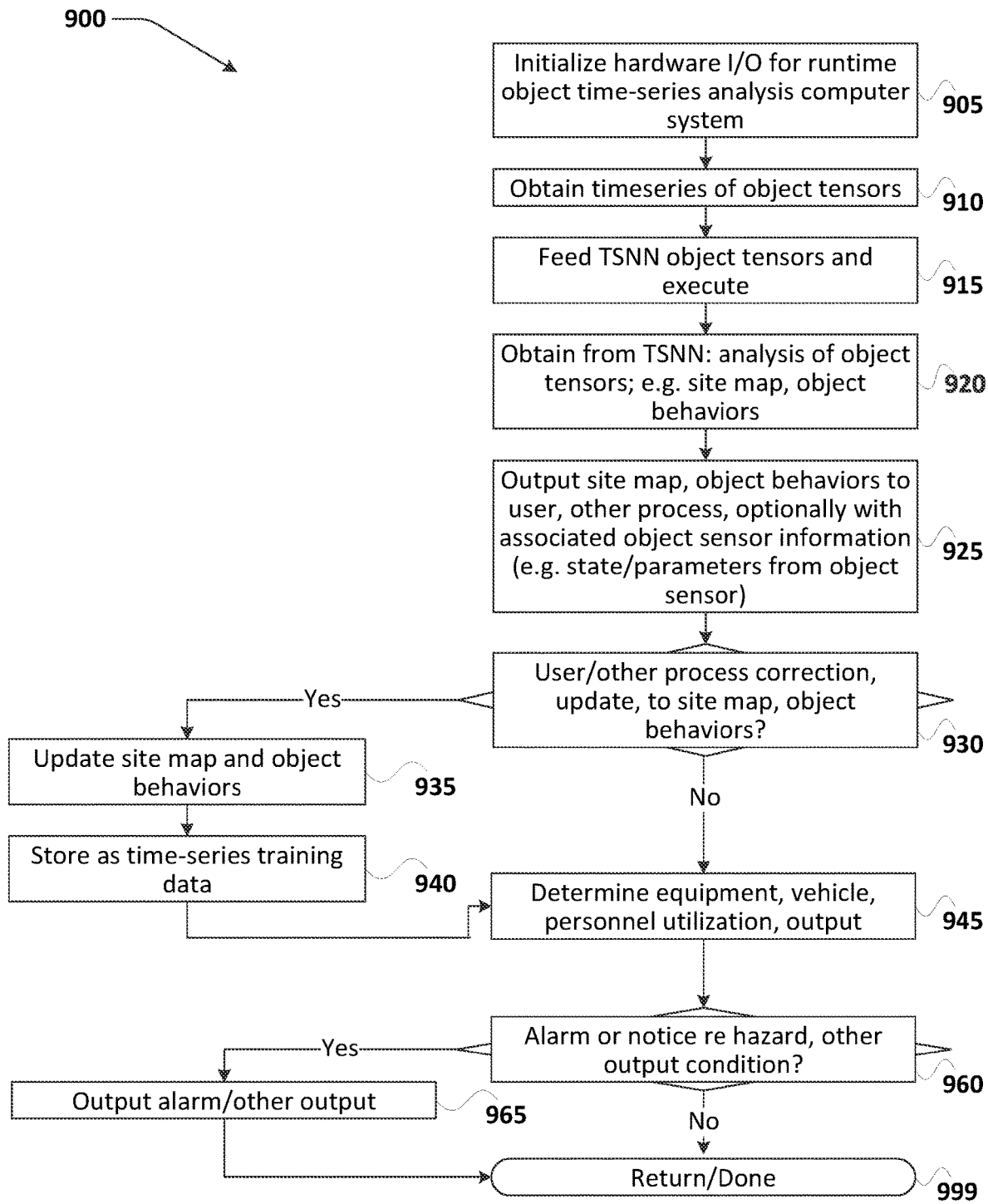
FIG. 9 is a flow diagram illustrating an example of a method performed by runtime object time-series analysis module, according to some embodiments.

FIG. 9 is a flow diagram illustrating an example of a method performed by runtime object time-series analysis module 900, incorporated with teachings of the present disclosure, according to some embodiments. Runtime object time-series analysis module 900 may be performed by or with the assistance of a hardware accelerator, such as hardware acceleration module 310. This module may be performed by, for example, site monitor runtime computer system 105 which, as noted, may be similar to site monitor machine learning computer 300.

At block 905, runtime object time-series analysis module 900 may initialize a hardware I/O for site monitor runtime computer system 105, connecting input and output for the computer system with modules of the computer system.

At block 910, runtime object time-series analysis module 900 may obtain a time-series of object tensors, e.g. from object tensor 465 records, e.g. from runtime object identification module 800. The object tensors may encode object sensor data, e.g. images, objects identified within such object sensor data, categories of such objects, object sensor data portion associated with objects, e.g. image portion, categories, and confidence level of such object identifications and categorizations.

At block 915, runtime object time-series analysis module 900 may load the TSNN, such as runtime time-series analysis neural network 430, with the object tensor 465 records of block 910 and perform the TSNN.

At block 920, runtime object time-series analysis module 900 may obtain analysis output from the TSNN, e.g. from runtime time-series analysis neural network 430. The analysis may comprise, for example, a site map, object behaviors (e.g. an object movement, a speed, an object movement preceding contact, an object contact, a crane pick, a hazardous condition, a theft, an accident, and the like), and the like produced by runtime time-series analysis neural network 430 and what it was trained to identify. The analysis may be stored as, for example, one or more site map 445 or behavior 420 record.

At block 925, runtime object time-series analysis module 900 may output the analysis of block 920 in a user interface, such as in a table computer, a laptop computer, a smartphone, a dedicated monitor, to another process, and the like. The user interface may be operated by, for example, user interface 210 module, e.g. in user interface 1100. The analysis may be output so as to identify objects identified by runtime object identification module 800, a site map, and behaviors of objects identified at block 920. The output may further output object sensor data associated with categories of such objects.

By way of example, if the object sensor data processed by the ODNN in runtime object identification module 800 is image data, such as a photograph or video of a site, then the image data may be output in a human-readable form, e.g.

object sensor data 405 records, with highlighting of object-triggering object sensor data 475, wherein such highlighting identifies objects in the image data, with categories associated with the objects, e.g. categories assigned by the ODNN. The user interface may further output the highlighted or identified objects in site map 445 and or in composite site image 455, with information from behavior 420 records identified and associated with the corresponding associated object.

The user interface may further output object sensor data associated with objects by, for example, block 716 of runtime generation module 700 or similar, in association with the objects in the user interface. For example, if the object sensor comprised an SLCS and if an SLCS provided object sensor data comprising state and parameter information of an SLCS, and if an SLCS object or a load object appears in the image output in the user interface, it may be output in associated with some or all of the state and parameter information provided by the SLCS.

At decision block 930, runtime object time-series analysis module 900 may determine whether a correction, update, or additional information is received from a user or another process in relation to the site map or object behavior generated by the analysis of the TSNN and output at block 925.

If affirmative or equivalent at decision block 930, at block 935, runtime object time-series analysis module 900 may update the analysis with the correction, update, or additional information. For example, a user may identify that a behavior occurred or did not occur, e.g. that two objects contacted or did not contact one another, that a hazardous condition occurred or did not occur, that an accident occurred or did not occur, that a portion of an image is an area of a site map, or the like. For example, a user may identify that a behavior was an accident and may identify movements preceding the accident.

At block 940, runtime object time-series analysis module 900 may store the updated record as, for example, one or more time-series training data 440 records, which may be used to train the TSNN.

At block 945, runtime object time-series analysis module 900 may determine, for example, a utilization of an object, such as of a personnel, site equipment, or vehicle, such as a crane. The utilization may be determined based on availability of such object, based on period of time, based on weather or other conditions which can effect utilization or availability. This may be output to a user or another process, such as in user interface 1100, by user interface module 210.

At block 955, runtime object time-series analysis module 900 may determine whether an alarm regarding a hazardous condition should be output, such as to warning beacon 135, to an operator of crane 110, to a site manager, to an operator of SLCS 125, or whether another output should be transmitted in response to an output condition.

If affirmative or equivalent at decision block 960, at block 965, runtime object time-series analysis module 900 may output the alarm or other output.

At done block 999, runtime object time-series analysis module 900 may conclude and/or return to a module and/or another process which may have called it.

Figure 10:
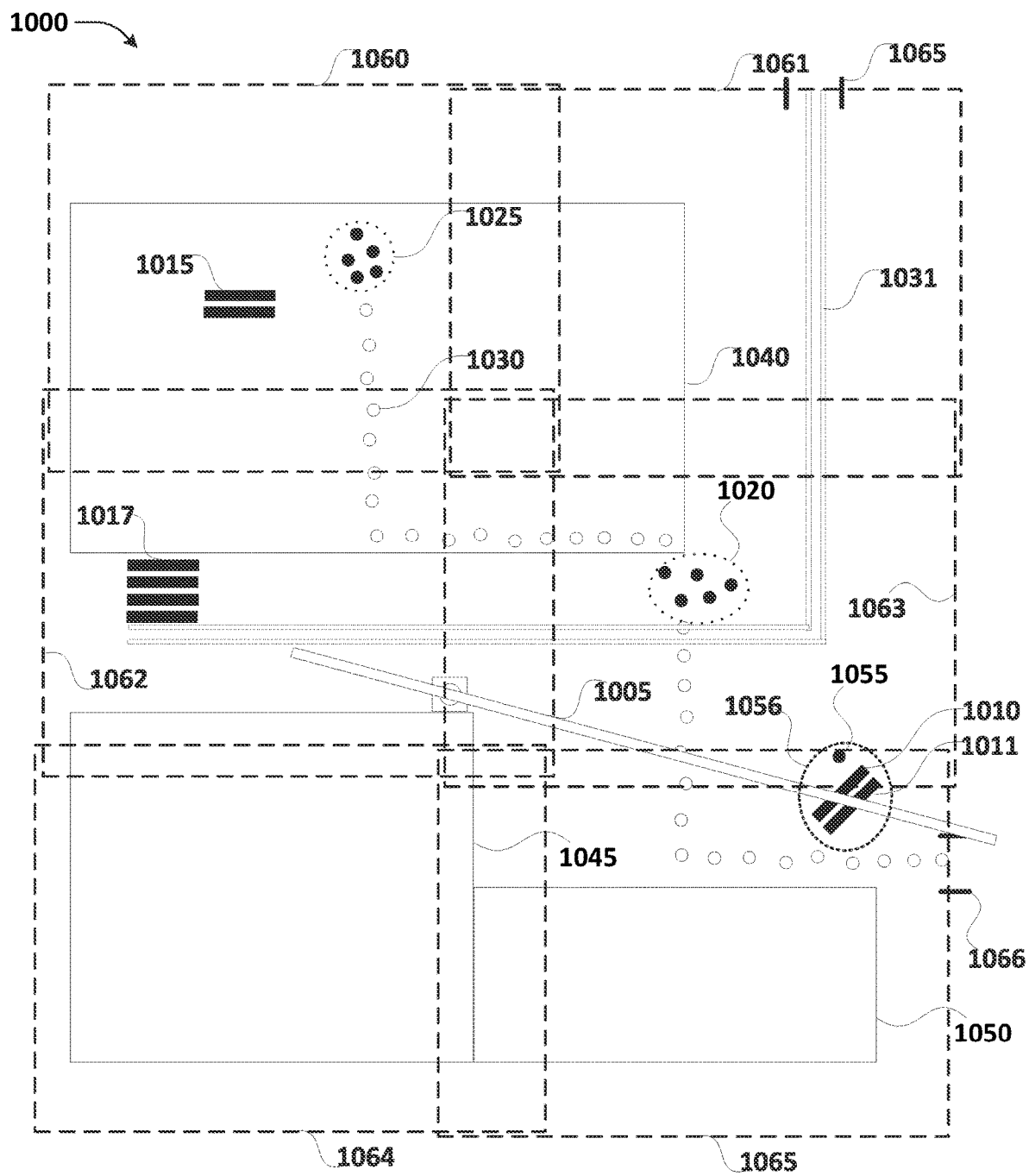
FIG. 10 is a schematic diagram of a site viewed by a site monitor machine learning computer, according to some embodiments.

FIG. 10 is a schematic diagram of a set of stitched images of a site viewed by a plurality of object sensors, e.g. by cameras. As discussed herein, a plurality of object sensors may be present on or have a view of a site, e.g. site 1000. As discussed herein, one or more of such object sensors may be a SLCS. In this example, first image 1060, second image 1061, third image 1062, fourth image 1063, fifth image 1064, and sixth image 1065 may be imaged by different object sensors at a same or similar time; in an embodiment, one or more of the images may be imaged by the same object sensor at different times, e.g. an SLCS moved by a carrier, such as carrier 1005, over site 1000. The images may overlap. In this example, first image 1060, second image 1061, third image 1062, fourth image 1063, fifth image 1064, and sixth image 1065 may be stitched together by, for example image stitching module 1200. The output may form, for example, site image 1120 of FIG. 11.

As discussed herein, runtime object identification module 800 and an ODNN, such as runtime object detection neural network 425, may process the images and may identify objects categorized as, for example, the following: building 1040, building 1045, and building 1050, construction materials 1010, construction materials 1015, and construction materials 1017, group of people 1025, group of people 1020, individual person 1055, crane 1005, gate 1065 and gate 1066. Group of people 1025, group of people 1020, and individual person 1055 may be identified as comprising safety equipment, such as hard hats, visibility clothing such as a vest, and the like, as discussed in relation to FIG. 1.

As discussed herein, runtime object time-series analysis module 900 and a TSNN, such as runtime time-series analysis neural network 430, may process object tensor 465 records from the ODNN and object sensor tensors and may determine a site map of the site and behaviors of objects imaged in the site. For example, the site map may comprise human path 1030 and vehicle path 1031. Such elements may be identified on the basis of time-series object sensor data collected from objects along such path and training data for the TSNN wherein such objects are associated with identification of human or vehicular pathways. For example, a behavior of objects which the TSNN may identify is that individual person 1055 is in hazard condition 1056, which the TSNN may identify because the TSNN has been trained to identify hazardous conditions based on labeled training data, wherein the training data comprises labeled or categorized hazardous conditions as occurring below crane picks. For example, a behavior of objects which the TSNN may identify may be crane pick 1011 (which may be a behavior category also assigned to construction materials 1010)

Figure 11:
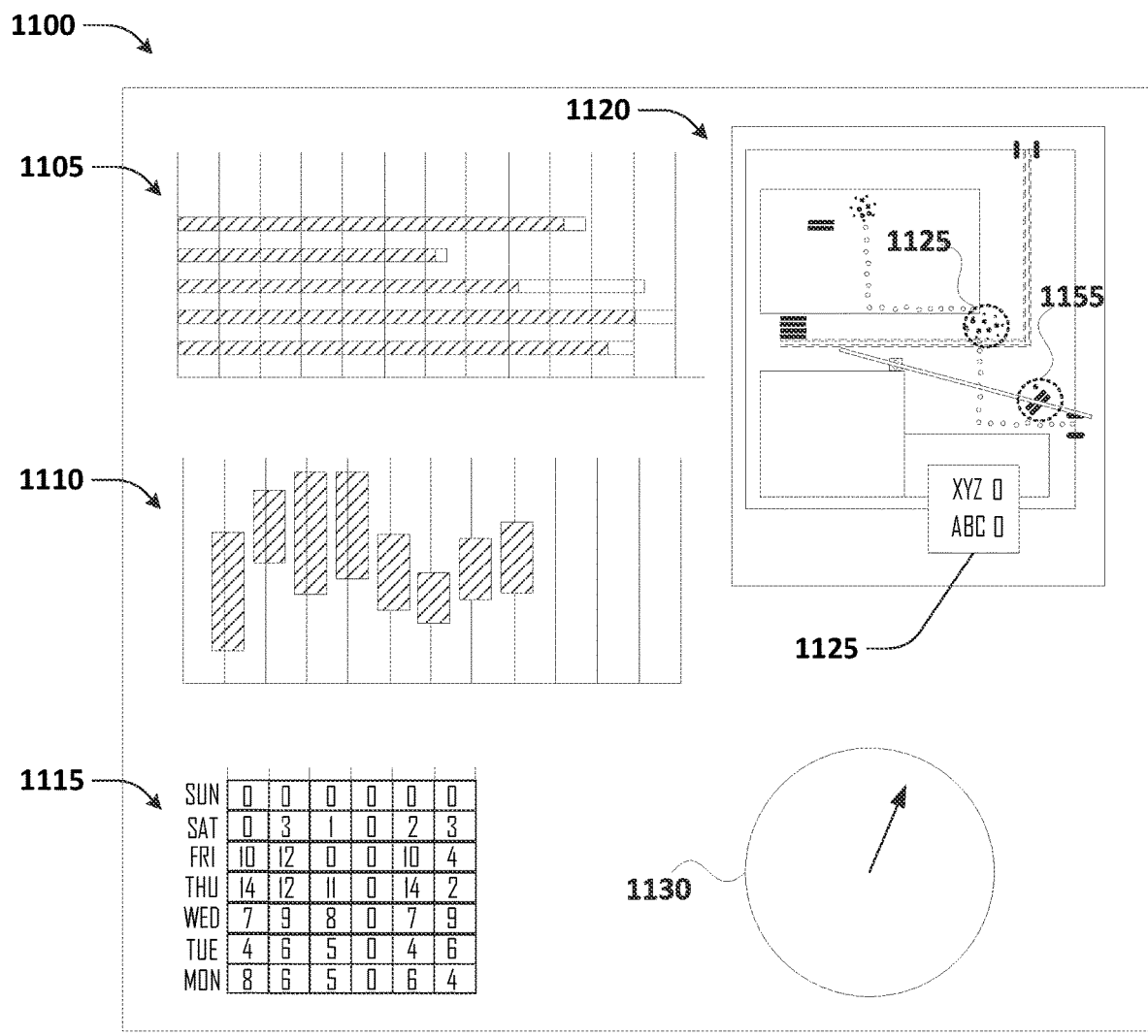
FIG. 11 is a schematic diagram of a user interface of a visualization module, according to some embodiments.

FIG. 11 is a schematic diagram of user interface 1100 which may be produced by a visualization module, such as visualization module 210, to output information from, for example, runtime object identification module 800 and or runtime object time-series analysis module 900.

For example, user interface 1100 may comprise site image 1120. Site image 1120 may be a stitched together by, for example image stitching module 1200. Site image 1120 may comprise static images or video.

For example, user interface 1100 may comprise object sensor data 1125. Object sensor data 1125 may comprise object sensor data associated with object categories, for example by runtime generation module 700, or another process. For example, object sensor data 1125 may comprise data from an SLCS, such as state or parameter information of an SLCS and load. For example, such state or parameter information may comprise a position, orientation, or motion of the SLCS and load and wherein the parameter comprises at least one of a length of suspension cable, a moment of inertia of the SLCS and or suspended load, a mass of the SLCS and suspended load, a battery condition of the SLCS, a wind load of or disturbance force on the SLCS and or suspended load, a thruster setting or thrust output of the SLCS, and whether a suspended load control module of the SLCS is active in trying to control a thruster of the SLCS to influence a near-term future state or parameter of the SLCS and suspended load.

For example, site image 1120, which may comprise one or more images or videos, may comprise objects identified by runtime object identification module 800, behaviors of such objects identified by runtime object time-series analysis module 900 and may comprise such objects highlighted or visually distinguished. For example, a person within area 1155 may be highlighted or visually distinguished, because such person was identified as a "person" object by runtime object identification module 800 and because the person object was exhibiting a behavior of a hazardous condition, as identified by runtime object time-series analysis module 900. Object sensor behavior associated with "person" categories, such as personnel records or identifiers may also be output.

For example, graph 1105 may present a number of violations and or violators of personal safety requirements, such as helmets and safety vest. Selection of the graph bars or a portion thereof may produce a corresponding image or video in site image 1120, from the time when data for the graph bars was produced.

For example, graph 1110 may present wind speed range, per day. For example, graph 1115 may present a pick count for a crane, e.g. reflecting a crane utilization over past weeks. For example, graphical display of information may follow the time-series of video images. For example, graphical display of information may include remaining battery power 1130, battery health, average duty cycle. For example, a user may be able to rewind, fast-forward, pause, and the like, both with respect to the video and the other object sensor data and associated output.

Figure 12:
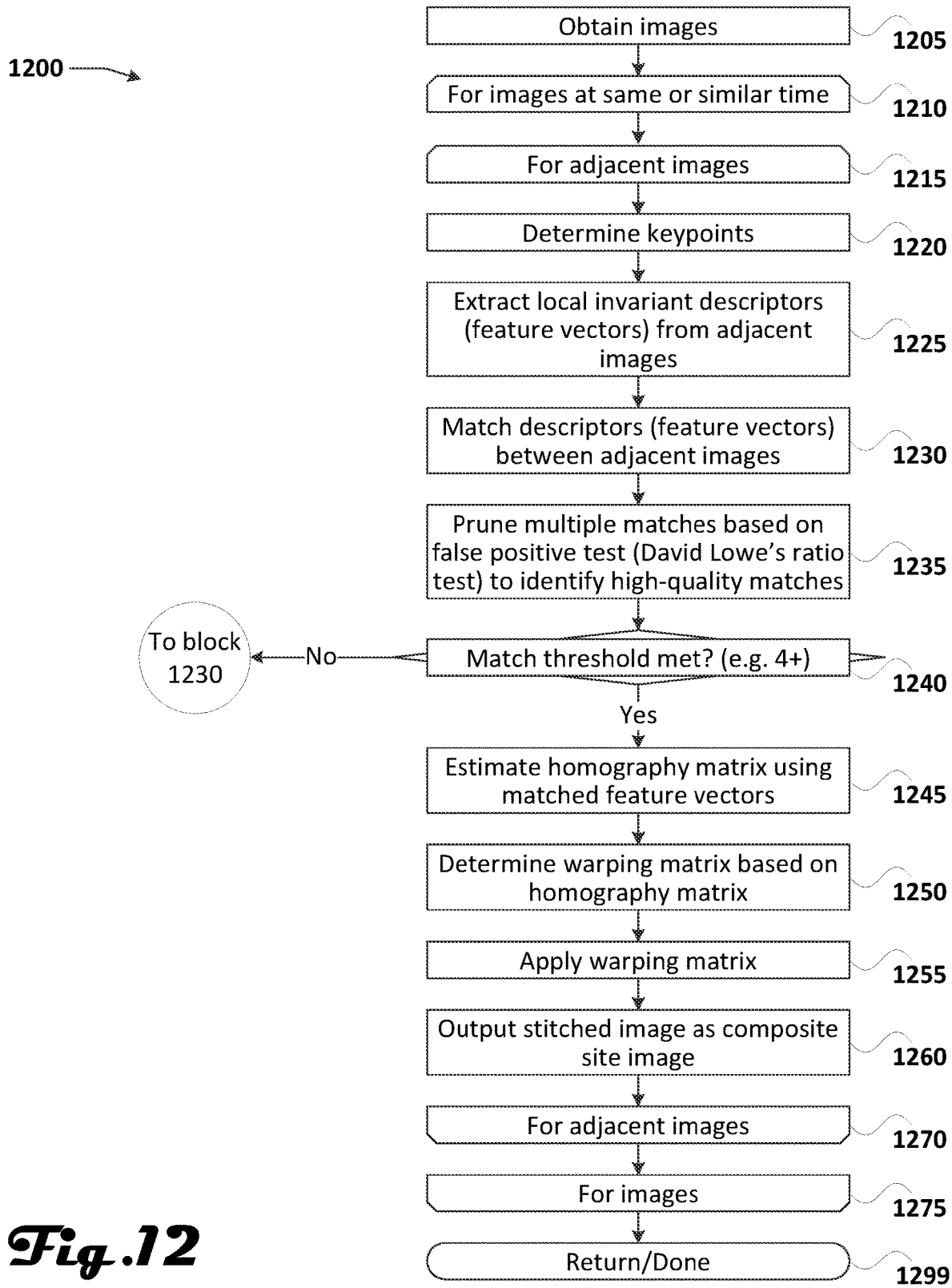
FIG. 12 is a flow diagram illustrating an example of a method performed by an image stitching module, according to some embodiments.

FIG. 12 is a flow diagram illustrating an example of a method performed by image stitching module 1200, incorporated with teachings of the present disclosure, according to some embodiments. Image stitching module 1200 may be performed by or with the assistance of a hardware accelerator, such as hardware acceleration module 310. This module may be performed by, for example, site monitor runtime computer system 105 which, as noted, may be similar to site monitor machine learning computer 300.

At block 1205, image stitching module 1200 may obtain images, e.g. from one or more object sensor data 405 records.

Opening loop block 1210 to closing loop block 1275 may iterate over a set or group of images at a same or similar time.

Opening loop block 1215 to closing loop block 1270 may iterate over adjacent images, such as two adjacent images.

At block 1220, image stitching module 1200 may determine keypoints of the then-current images, such as with a difference of gaussian keypoint detector or the like.

At block 1225, image stitching module 1200 may extract local invariant descriptors, which may comprise, for example, feature vectors, as may be obtained with or by a SIFT feature extractor or the like.

At block 1230, image stitching module 1200 may match the local invariant descriptors, e.g. feature vectors, between the then-current adjacent images.

At block 1235, if multiple matches, image stitching module 1200 may prune multiple invariant descriptor matches based on a false positive test, such as David Low's ratio test, to identify higher-quality matches.

At decision block 1240, image stitching module 1200 may determine whether a match threshold has been met, e.g, four or greater.

If negative or equivalent at decision block 1240, image stitching module 1200 may return to block 1230.

If affirmative or equivalent at decision block 1240, at block 1245, image stitching module 1200 may estimate a homography matrix using matched feature vectors.

At block 1250, image stitching module 1200 may determine a warping matrix based on the homography matrix.

At block 1255, image stitching module 1200 may apply the determined warping matrix to the then-current adjacent images.

At block 1260 and if completed for all images for a site, image stitching module 1200 may output a stitched image comprising the adjacent images.

At done block 1299, image stitching module 1200 may conclude and or return to a module and/or another process which may have called it.

Figure 13:
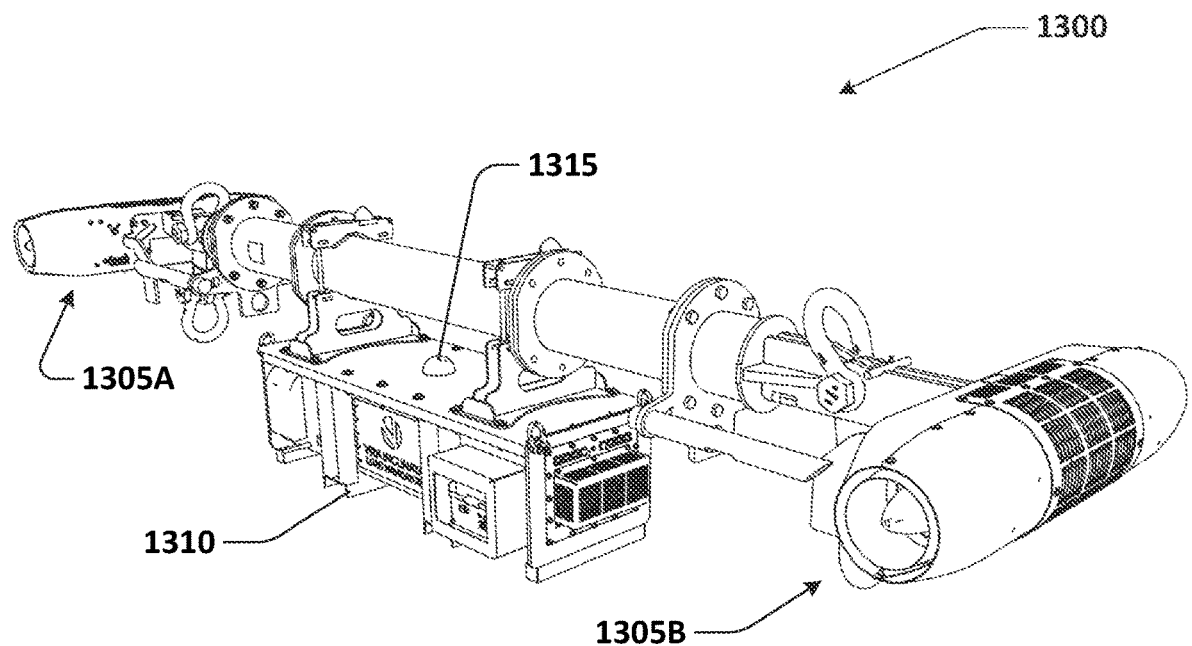
FIG. 13 is an oblique perspective view of a suspended load control system, according to some embodiments.

FIG. 13 is an oblique perspective view of suspended load control system ("SLCS") 1300, according to some embodiments. Physical components of SLCS 1300 may comprise fan unit 1305A and fan unit 1305B, each of which may comprise two asymmetric uni-directional fans driven by one or more motors, under control of a suspended load control module, as discussed herein. Housing 1310 may comprise physical and logical components.

Physical components of housing 1310 may comprise object sensor 1315, which may be a video camera, including a hemispherical video camera. One or more similar object sensors, such as video cameras, may have a downward view, on a bottom of housing 1310. Physical components of or within housing 1310 may comprise a power supply, e.g. batteries, and hardware for logical components, e.g. computer hardware and computer memory. The suspended load control module may be in-memory, in the computer memory, and may be performed by the computer hardware, as discussed herein.

Figure 14:
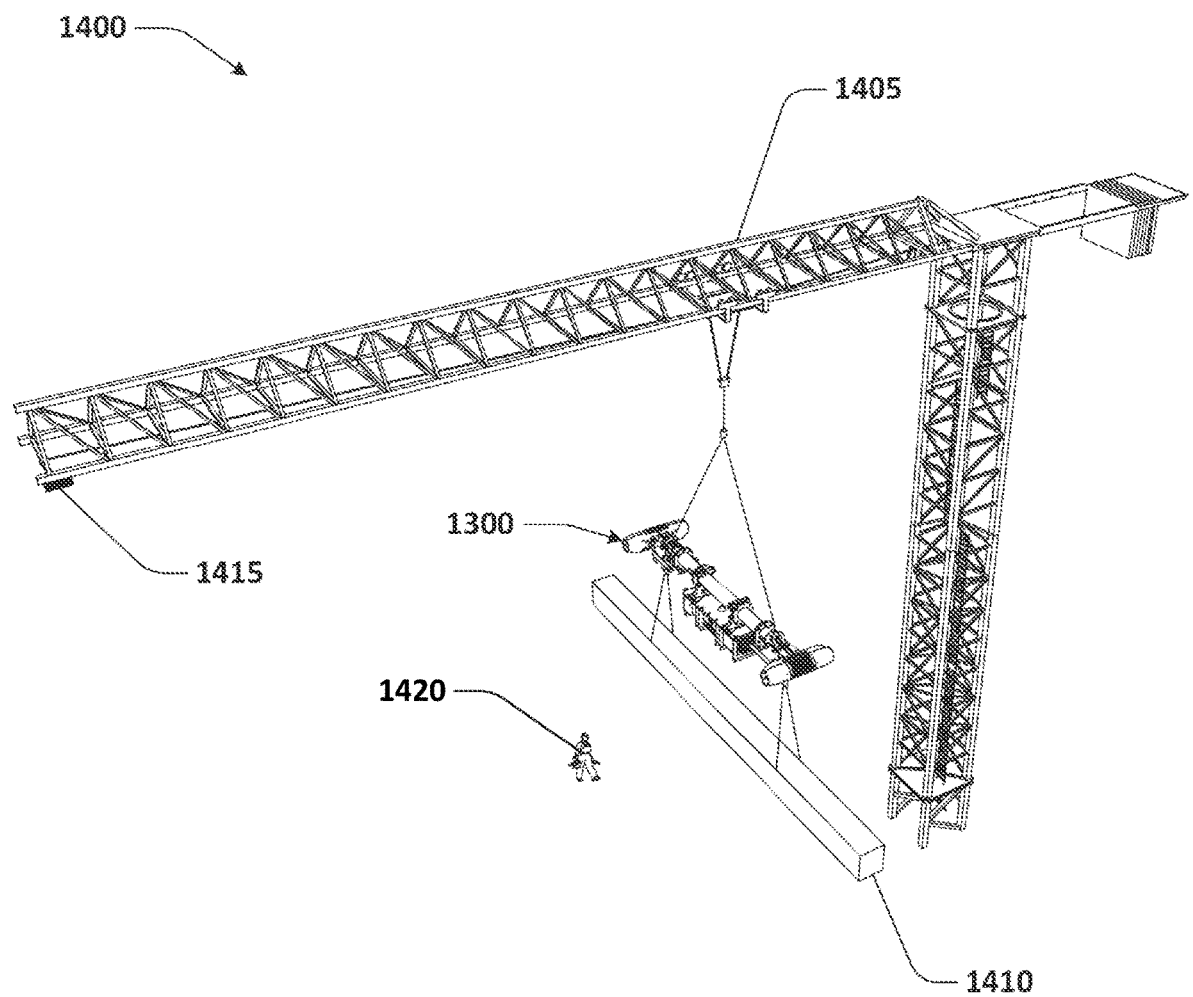
FIG. 14 is an oblique perspective view of a suspended load control system and a carrier, according to some embodiments.

FIG. 14 is an oblique perspective view of SLCS 1300 and carrier 1405 in site 1400, according to some embodiments. In this example, SLCS 1300 performs a pick with respect to suspended load 1410. Object sensors of SLCS 1300, e.g. object sensor 1315 and similar on a bottom side of SLCS 1300, and additional object sensors, such as object sensor 1415, may image site 1400. SLCS 1300 may perform all or part of object identification neural training module 500, time-series neural training module 600, runtime generation module 700, runtime object identification module 800, runtime object time-series analysis module 900, image stitching module 1200 and visualization module 210, as discussed herein.

In performance of the foregoing modules, SLCS 1300 may identify that person 1420 exhibits a behavior comprising a hazardous condition and may trigger an alert. This identification may be caused because, as discussed herein, time-series training data 440 may comprise video images in which a person is beneath a suspended load, or is moving into a position beneath a potential path of a suspended load. For example, such video images may be processed by runtime object identification module 800, identifying SLCS 1300 as a "suspended load control system", identifying suspended load 1410 as a "suspended load" and wherein object tensors output by runtime object identification module 800 are processed by runtime object time-series analysis module 900, identifying the person 1420 exhibits a "hazardous condition" behavior because, for example, person 1420 is moving below suspended load 1410.

Aspects of the system can be embodied in a specialized or special purpose computing device or data processor that is specifically programmed, configured, or constructed to perform one or more of the computer-executable instructions explained in detail herein. Aspects of the system can also be practiced in distributed computing environments where tasks or modules are performed by remote processing devices that are linked through a communications network, such as a local area network (LAN), wide area network (WAN), the Internet, or any radio frequency communication technology. Data from deployable equipment may be of very low bandwidth and may not be restricted to a frequency or communication protocol. In a distributed computing environment, modules can be located in both local and remote memory storage devices. Logic or circuits embodying logic may be discussed as comprising a particular order or structure to accomplish an effect; the order or structure may be reorganized so long as the effect is still accomplished.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions. USB (Universal serial bus) may comply or be compatible with Universal Serial Bus Specification, Revision 2.0, published by the Universal Serial Bus organization, Apr. 27, 2000, and/or later versions of this specification, for example, Universal Serial Bus Specification, Revision 3.1, published Jul. 26, 2013. PCIe may comply or be compatible with PCI Express 3.0 Base specification, Revision 3.0, published by Peripheral Component Interconnect Special Interest Group (PCI-SIG), November 2010, and/or later and/or related versions of this specification.

As used in any embodiment herein, the term "logic" may refer to the logic of the instructions of an app, software, and/or firmware, and/or the logic embodied into a programmable circuitry by a configuration bit stream, to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as FPGA. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

As used herein, the term "module" (or "logic") may refer to, be part of, or include an Application Specific Integrated Circuit (ASIC), a System on a Chip (SoC), an electronic circuit, a programmed programmable circuit (such as, Field Programmable Gate Array (FPGA)), a processor (shared, dedicated, or group) and/or memory (shared, dedicated, or group) or in another computer hardware component or device that execute one or more software or firmware programs having executable machine instructions (generated from an assembler and/or a compiler) or a combination, a combinational logic circuit, and/or other suitable components with logic that provide the described functionality. Modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

As used herein, a process corresponds to an instance of a program, e.g., an application program, executing on a processor and a thread corresponds to a portion of the process. A processor may include one or more execution core(s). The processor may be configured as one or more socket(s) that may each include one or more execution core(s).

Following are non-limiting examples of embodiments of the disclosure herein:

Example 1. A system to identify an object and determine a categorization of the object through visual analysis of a site comprising: a computer processor and a memory; a runtime object identification module in the memory, wherein to identify the object and to determine the categorization of the object through visual analysis of the site, the computer processor is to execute the runtime object identification module and is to thereby obtain an object sensor data with respect to the site, identify the object in the object sensor data, and determine the categorization of the object.

Example 2. The system according to at least one of Example 1 or another example or example herein, wherein the site is a construction site.

Example 3. The system according to at least one of Example 1 to Example 2 or another example or example herein, wherein the object sensor data comprises an image of the site.

Example 4. The system according to at least one of Example 1 to Example 3 or another example or example herein, wherein to determine the categorization of the object in the image, the runtime object identification module is to process the image with an object detection neural network and is to thereby identify the object in the image, determine the categorization of the object, and determine a confidence value with respect to at least one of the object or the categorization of the object.

Example 5. The system according to at least one of Example 1 to Example 4 or another example or example herein, wherein the object detection neural network comprises a convolutional neural network.

Example 6. The system according to at least one of Example 1 to Example 5 or another example or example herein, wherein the runtime object identification module is to determine the categorization of the object in the image to be at least one of a carrier, a crane, a suspended load, a person, an authorized person, a non-authorized person, a safety equipment, a helmet, a visibility vest, a fence, a site mechanical equipment, suspended load control system, a site building, a site building material, or contacting objects.

Example 7. The system according to at least one of Example 1 to Example 6 or another example or example herein, wherein the system is to be suspended by a suspension cable of a construction crane above the site.

Example 8. The system according to at least one of Example 1 to Example 7 or another example or example herein, wherein the system comprises a suspended load control system.

Example 9. The system according to at least one of Example 1 to Example 8 or another example or example herein, wherein the runtime object identification module is to output an object tensor, wherein the object tensor encodes at least one of an image portion corresponding to the object, the object, and the categorization of the object.

Example 10. The system according to at least one of Example 1 to Example 9 or another example or example herein, wherein the runtime object identification module is to output at least one of an image portion corresponding to the object, the object, or the categorization of the object.

Example 11. The system according to at least one of Example 1 to Example 9 or another example or example herein, wherein the runtime object identification module is to output at least one of the image portion corresponding to the object, the object, or the categorization of the object to a human for confirmation by the human.

Example 12. The system according to at least one of Example 1 to Example 10 or another example or example herein, wherein the runtime object identification module is to save a human feedback regarding at least one of the image portion corresponding to the object, the object, or the categorization of the object as an object identification training data, wherein the object identification training data is to train the object detection neural network to identify at least one of the image portion corresponding to the object, the object, or the categorization of the object.

Example 13. The system according to at least one of Example 1 to Example 12 or another example or example herein, wherein the system is further to determine at least one of a site map or a behavior of the object, wherein the system further comprises a runtime object time-series analysis module in the memory, and wherein to determine at least one of the site map or the behavior of the object, the computer processor is to execute the runtime object time-series analysis module, is to process the object tensor with the runtime object time-series analysis module and is to thereby obtain at least one of the site map or the behavior of the object from the runtime object time-series analysis module.

Example 14. The system according to at least one of Example 1 to Example 13 or another example or example herein, wherein the behavior comprises at least one of an object movement, a speed, an object movement preceding contact, an object contact, a crane pick, a hazardous condition, a theft, or an accident.

Example 15. The system according to at least one of Example 1 to Example 13 or another example or example herein, wherein the crane pick comprises a crane picking up a suspended load.

Example 16. The system according to at least one of Example 1 to Example 14 or another example or example herein, wherein the runtime object time-series analysis module comprises a time-series neural network.

Example 17. The system according to at least one of Example 1 to Example 16 or another example or example herein, wherein the time-series neural network comprises a long short-term memory recurrent neural network.

Example 18. The system according to at least one of Example 1 to Example 17 or another example or example herein, wherein the runtime object time-series analysis module is to output at least one of the site map or the behavior of the object.

Example 19. The system according to at least one of Example 1 to Example 17 or another example or example herein, wherein the runtime object time-series analysis module is to output at least one of the site map or the behavior of the object to a human for confirmation by human.

Example 20. The system according to at least one of Example 1 to Example 18 or another example or example herein, wherein the runtime object time-series analysis module is to save a human feedback regarding at least one of the site map or the behavior of the object as a time-series training data, wherein the time-series training data is to train the time-series neural network.

Example 21. The system according to at least one of Example 1 to Example 20 or another example or example herein, wherein the system is further to train the object detection neural network to identify the object and to determine the categorization of the object and further comprising in the memory an object identification neural training module, wherein to train the object detection neural network to identify the object and to determine the categorization of the object, the object identification neural training module is to obtain an object identification training dataset, input into the object detection neural network a first portion of the object identification training dataset, train the object detection neural network to identify the object and to determine the categorization of the object, and is further to test the object detection neural network with a second portion of the object identification training dataset.

Example 22. The system according to at least one of Example 1 to Example 21 or another example or example herein, wherein the object identification training dataset comprises images, objects identified in such images, and categorizations of the objects identified in such images.

Example 23. The system according to at least one of Example 1 to Example 22 or another example or example herein, wherein the system is further to train the time-series neural network to identify the site map and the behavior and further comprising in the memory a time-series neural training module, wherein to train time-series neural network to identify the site map and the behavior the time-series neural training module is to obtain a time-series training dataset, input into the time-series neural network a first portion of the time-series training dataset, train the time-series neural network to identify the site map and the behavior according to the first portion of the time-series training dataset, and is further to test the time-series neural network with a second portion of the time-series training dataset.

Example 24. The system according to at least one of Example 1 to Example 23 or another example or example herein, wherein the time-series training dataset comprises images, objects identified in such images, categorizations of the objects identified in such images, site maps, and object behaviors.

Example 25. The system according to at least one of Example 1 to Example 24 or another example or example herein, wherein the time-series training dataset comprises object tensors, wherein the object tensors encode at least one of images, objects identified in such images, or categorizations of the objects identified in such images, and wherein the time-series training dataset further comprises at least one of site maps and object behaviors to be derived from such object tensors.

Example 26. The system according to at least one of Example 1 to Example 25 or another example or example herein, wherein the object sensor is a first object sensor and further comprising a second object sensor, wherein the second object comprises at least one of a wind speed sensor or a sensor suite of a suspended load control system.

Example 27. The system according to at least one of Example 1 to Example 26 or another example or example herein, wherein the sensor data is a first sensor data, wherein the system is further to associate a second sensor data with the categorization of the object, and wherein the system is further to output a processed image to a human, determine the object to be present in the processed image to the human according to the categorization of the object and, due to the categorization of the object, is to output the second sensor data in the image output to the human in association with the object.

Example 28. The system according to at least one of Example 1 to Example 27 or another example or example herein, wherein the second sensor data comprises at least one of wind speed, a state or parameter of a suspended load control device.

Example 29. The system according to at least one of Example 1 to Example 28 or another example or example herein, wherein the system is further to determine and output at least one of an equipment utilization, a vehicle utilization, a personnel utilization, or an alarm regarding identification of a behavior comprising a hazardous condition.

Example 30. The system according to at least one of Example 1 to Example 29 or another example or example herein, wherein the system is further to stitch together a plurality of images of the site into a composite image of the site and further comprising an image stitching module in the memory, wherein to stitch together the plurality of images of the site into the composite image of the site, the computer processor is to execute the image stitching module, obtain a plurality of images of the site, and combine the plurality of images to form the composite image of the site.

Example 31. The system according to at least one of Example 1 to Example 30 or another example or example herein, wherein the system is further to output the composite image of the site in conjunction with at least one of the object, the object category, the site map, or the behavior visually distinguished in the composite image of the site.

Example 32. The system according to at least one of Example 1 to Example 31 or another example or example herein, wherein to combine the plurality of images to form the composite image of the site, the image stitching module is to determine local invariant descriptors of keypoints of adjacent images in the plurality of images of the site, determine a group of matched local invariant descriptors of the keypoints, estimate a homography matrix using the matched local invariant descriptors of the keypoints, determine a warping matrix based on the homography matrix, and apply the warping matrix to the adjacent images in the plurality of images of the site to form the composite image of the site.

Example 33. The system according to at least one of Example 1 to Example 32 or another example or example herein, wherein the system is further to output a processed image to a human and is to output in the processed image to the human at least one of a behavior of the object or a second sensor data.

Example 34. The system according to at least one of Example 1 to Example 33 or another example or example herein, wherein the behavior comprises at least one of a human wearing a safety equipment, a human not wearing a safety equipment, an object movement, a speed, an object movement preceding contact, an object contact, a crane pick, a hazardous condition, a theft, an accident, or a crane pick.

Example 35. The system according to at least one of Example 1 to Example 34 or another example or example herein, wherein the second sensor data comprises least one of a wind speed, a battery condition of a site equipment, or a state or parameter of a suspended load control system.

Example 36. The system according to at least one of Example 1 to Example 35 or another example or example herein, wherein the hazardous condition comprises a person beneath a suspended load.

Example 37. The system according to at least one of Example 1 to Example 36 or another example or example herein, wherein the state of the suspended load control system comprises at least one of a position, orientation, or motion of the suspended load control system and suspended load and wherein the parameter comprises at least one of a length of suspension cable, a moment of inertia of the suspended load control system and or suspended load, a mass of the suspended load control system and suspended load, a battery condition of the suspended load control system, a wind load of or disturbance force on the suspended load control system and or suspended load, a thruster setting or thrust output of the suspended load control system, and whether a suspended load control module of the suspended load control system is active in trying to control a thruster of the suspended load control system to influence a near-term future state or parameter of the suspended load control system and suspended load.

Example 38 The system according to at least one of Example 1 to Example 37 or another example or example herein, wherein the object sensor comprises a suspended load control system, wherein the suspended load control system comprises a thruster, a sensor suite, and a suspended load control module, wherein the suspended load control module is to be executed by a processor of the object sensor and is to estimate or predict a state or parameter of the object based on a sensor data from the sensor suite.

Example 39. A method to identify an object and determine a categorization of the object through visual analysis of a site comprising: with a computer processor, a memory and a runtime object identification module in the memory, wherein the method to identify the object and to determine the categorization of the object through visual analysis of the site comprises the computer processor executing the runtime object identification module and thereby obtaining an object sensor data with respect to the site, identifying the object in the object sensor data, and determining the categorization of the object.

Example 40. The method according to at least one of Example 39 or another example or example herein, wherein the site is a construction site.

Example 41. The method according to at least one of Example 39 to Example 40 or another example or example herein, wherein the object sensor data comprises an image of the site.

Example 42. The method according to at least one of Example 39 to Example 41 or another example or example herein, wherein determining the categorization of the object in the image comprises processing the image with an object detection neural network and thereby identifying the object in the image, determining the categorization of the object, and determining a confidence value with respect to at least one of the object or the categorization of the object.

Example 43. The method according to at least one of Example 39 to Example 42 or another example or example herein, wherein the object detection neural network comprises a convolutional neural network.

Example 44. The method according to at least one of Example 39 to Example 43 or another example or example herein, further comprising determining the categorization of the object in the image to be at least one of a carrier, a crane, a suspended load, a person, an authorized person, a non-authorized person, a safety equipment, a helmet, a visibility vest, a fence, a site mechanical equipment, suspended load control system, a site building, a site building material, or contacting objects.

Example 45. The method according to at least one of Example 39 to Example 44 or another example or example herein, wherein the processor and memory are to be suspended by a suspension cable of a construction crane above the site.

Example 46. The method according to at least one of Example 39 to Example 46 or another example or example herein, wherein the processor and memory are of a suspended load control system.

Example 47. The method according to at least one of Example 39 to Example 46 or another example or example herein, further comprising the runtime object identification module preparing and outputting an object tensor, wherein the object tensor encodes at least one of an image portion corresponding to the object, the object, and the categorization of the object.

Example 48. The method according to at least one of Example 39 to Example 47 or another example or example herein, further comprising the runtime object identification module outputting at least one of an image portion corresponding to the object, the object, or the categorization of the object.

Example 49. The method according to at least one of Example 39 to Example 48 or another example or example herein, further comprising the runtime object identification module outputting at least one of the image portion corresponding to the object, the object, or the categorization of the object to a human for confirmation by the human.

Example 50. The method according to at least one of Example 39 to Example 49 or another example or example herein, further comprising the runtime object identification module saving a human feedback regarding at least one of the image portion corresponding to the object, the object, or the categorization of the object as an object identification training data, and further comprising the object identification training data being used to train the object detection neural network to identify at least one of the image portion corresponding to the object, the object, or the categorization of the object.

Example 51. The method according to at least one of Example 39 to Example 50 or another example or example herein, wherein the method is further to determine at least one of a site map or a behavior of the object, further comprising a runtime object time-series analysis module in the memory, and wherein to determine at least one of the site map or the behavior of the object, the computer processor executing the runtime object time-series analysis module and thereby processing the object tensor with the runtime object time-series analysis module and obtaining at least one of the site map or the behavior of the object from the runtime object time-series analysis module.

Example 52. The method according to at least one of Example 39 to Example 51 or another example or example herein, further comprising the runtime object time-series analysis module determining the behavior to comprise at least one of an object movement, a speed, an object movement preceding contact, an object contact, a crane pick, a hazardous condition, a theft, or an accident.

Example 53. The method according to at least one of Example 39 to Example 52 or another example or example herein, wherein the crane pick comprises a crane picking up a suspended load.

Example 54. The method according to at least one of Example 39 to Example 53 or another example or example herein, wherein the runtime object time-series analysis module comprises a time-series neural network.

Example 55. The method according to at least one of Example 39 to Example 54 or another example or example herein, wherein the time-series neural network comprises a long short-term memory recurrent neural network.

Example 56. The method according to at least one of Example 39 to Example 55 or another example or example herein, further comprising the runtime object time-series analysis module outputting at least one of the site map or the behavior of the object.

Example 57. The method according to at least one of Example 39 to Example 56 or another example or example herein, further comprising the runtime object time-series analysis module outputting at least one of the site map or the behavior of the object to a human for confirmation by human.

Example 58. The method according to at least one of Example 39 to Example 57 or another example or example herein, further comprising the runtime object time-series analysis module saving a human feedback regarding at least one of the site map or the behavior of the object as a time-series training data, wherein the time-series training data is to train the time-series neural network.

Example 59. The method according to at least one of Example 39 to Example 58 or another example or example herein, wherein the method is further to train the object detection neural network to identify the object and to determine the categorization of the object and further comprising in the memory an object identification neural training module, wherein to train the object detection neural network to identify the object and to determine the categorization of the object comprises the processor executing the object identification neural training module and thereby obtaining an object identification training dataset, inputting into the object detection neural network a first portion of the object identification training dataset, training the object detection neural network to identify the object and to determine the categorization of the object, and further comprises testing the object detection neural network with a second portion of the object identification training dataset.

Example 60. The method according to at least one of Example 39 to Example 59 or another example or example herein, wherein the object identification training dataset comprises images, objects identified in such images, and categorizations of the objects identified in such images.

Example 61. The method according to at least one of Example 39 to Example 60 or another example or example herein, wherein the method is further to train the time-series neural network to identify the site map and the behavior and further comprising in the memory a time-series neural training module, wherein to train time-series neural network to identify the site map and the behavior comprises the time-series neural training module obtaining a time-series training dataset, inputting into the time-series neural network a first portion of the time-series training dataset, training the time-series neural network to identify the site map and the behavior according to the first portion of the time-series training dataset, and further testing the time-series neural network with a second portion of the time-series training dataset.

Example 62. The method according to at least one of Example 39 to Example 61 or another example or example herein, wherein the time-series training dataset comprises images, objects identified in such images, categorizations of the objects identified in such images, site maps, and object behaviors.

Example 63. The method according to at least one of Example 39 to Example 62 or another example or example herein, wherein the time-series training dataset comprises object tensors, wherein the object tensors encode at least one of images, objects identified in such images, or categorizations of the objects identified in such images, and wherein the time-series training dataset further comprises at least one of site maps and object behaviors to be derived from such object tensors.

Example 64. The method according to at least one of Example 39 to Example 64 or another example or example herein, wherein the object sensor is a first object sensor and further comprising a second object sensor, wherein the second object comprises at least one of a wind speed sensor or a sensor suite of a suspended load control system.

Example 65. The method according to at least one of Example 39 to Example 64 or another example or example herein, wherein the sensor data is a first sensor data, wherein the method further comprises associating a second sensor data with the categorization of the object, outputting a processed image to a human, determining the object to be present in the processed image to the human according to the categorization of the object and, due to the categorization of the object, outputting the second sensor data in the image output to the human in association with the object.

Example 66. The method according to at least one of Example 39 to Example 65 or another example or example herein, wherein the second sensor data comprises at least one of wind speed, a state or parameter of a suspended load control device.

Example 67. The method according to at least one of Example 39 to Example 66 or another example or example herein, wherein the method further comprises determining and outputting at least one of an equipment utilization, a vehicle utilization, a personnel utilization, or an alarm regarding identification of a behavior comprising a hazardous condition.

Example 68. The method according to at least one of Example 39 to Example 67 or another example or example herein, wherein the method is further to stitch together a plurality of images of the site into a composite image of the site and further comprising an image stitching module in the memory, wherein to stitch together the plurality of images of the site into the composite image of the site comprises the computer processor executing the image stitching module and thereby obtaining a plurality of images of the site and combining the plurality of images to form the composite image of the site.

Example 69. The method according to at least one of Example 39 to Example 68 or another example or example herein, wherein the method further comprises outputting the composite image of the site in conjunction with at least one of the object, the object category, the site map, or the behavior visually distinguished in the composite image of the site.

Example 70. The method according to at least one of Example 39 to Example 69 or another example or example herein, wherein combining the plurality of images to form the composite image of the site comprises the image stitching module determining local invariant descriptors of keypoints of adjacent images in the plurality of images of the site, determining a group of matched local invariant descriptors of the keypoints, estimating a homography matrix using the matched local invariant descriptors of the keypoints, determining a warping matrix based on the homography matrix, and applying the warping matrix to the adjacent images in the plurality of images of the site to form the composite image of the site.

Example 71. The method according to at least one of Example 39 to Example 70 or another example or example herein, wherein the method further comprises outputting a processed image to a human and outputting in the processed image to the human at least one of a behavior of the object or a second sensor data.

Example 72. The method according to at least one of Example 39 to Example 71 or another example or example herein, wherein the behavior comprises at least one of a human wearing a safety equipment, a human not wearing a safety equipment, an object movement, a speed, an object movement preceding contact, an object contact, a crane pick, a hazardous condition, a theft, an accident, or a crane pick.

Example 73. The method according to at least one of Example 39 to Example 72 or another example or example herein, wherein the second sensor data comprises least one of a wind speed, a battery condition of a site equipment, or a state or parameter of a suspended load control system.

Example 74. The method according to at least one of Example 39 to Example 73 or another example or example herein, wherein the hazardous condition comprises a person beneath a suspended load.

Example 75. The method according to at least one of Example 39 to Example 74 or another example or example herein, wherein the state of the suspended load control system comprises at least one of a position, orientation, or motion of the suspended load control system and suspended load and wherein the parameter comprises at least one of a length of suspension cable, a moment of inertia of the suspended load control system and or suspended load, a mass of the suspended load control system and suspended load, a battery condition of the suspended load control system, a wind load of or disturbance force on the suspended load control system and or suspended load, a thruster setting or thrust output of the suspended load control system, and whether a suspended load control module of the suspended load control system is active in trying to control a thruster of the suspended load control system to influence a near-term future state or parameter of the suspended load control system and suspended load.

Example 76 The method according to at least one of Example 39 to Example 75 or another example or example herein, wherein the object sensor comprises a suspended load control system, wherein the suspended load control system comprises a thruster, a sensor suite, and a suspended load control module, and further comprising a processor of the suspended load control system executing the suspended load control module and thereby estimating or predicting a state or parameter of the object based on a sensor data from the sensor suite.

Example 77. One or more computer-readable media comprising instructions that cause a computer device, in response to execution of the instructions by a processor of the computer device to: identify an object and determine a categorization of the object through visual analysis of a site by causing the processor of the computer device to execute a runtime object identification module obtained from a memory of the computer device and to thereby obtain an object sensor data with respect to the site, identify the object in the object sensor data, and determine the categorization of the object.

Example 78. The computer-readable media according to at least one of Example 77 or another example or example herein, wherein the site is a construction site.

Example 79. The computer-readable media according to at least one of Example 77 to Example 78 or another example or example herein, wherein the object sensor data comprises an image of the site.

Example 80. The computer-readable media according to at least one of Example 77 to Example 79 or another example or example herein, wherein to determine the categorization of the object in the image comprises to process the image with an object detection neural network and to thereby identify the object in the image, determine the categorization of the object, and determine a confidence value with respect to at least one of the object or the categorization of the object.

Example 81. The computer-readable media according to at least one of Example 77 to Example 80 or another example or example herein, wherein the object detection neural network comprises a convolutional neural network.

Example 82. The computer-readable media according to at least one of Example 77 to Example 81 or another example or example herein, wherein the instructions are further to cause the computer device to determine the categorization of the object in the image to be at least one of a carrier, a crane, a suspended load, a person, an authorized person, a non-authorized person, a safety equipment, a helmet, a visibility vest, a fence, a site mechanical equipment, suspended load control system, a site building, a site building material, or contacting objects.

Example 83. The computer-readable media according to at least one of Example 77 to Example 82 or another example or example herein, wherein the computer device is to be suspended by a suspension cable of a construction crane above the site.

Example 84. The computer-readable media according to at least one of Example 77 to Example 83 or another example or example herein, wherein the computer device is of a suspended load control system.

Example 85. The computer-readable media according to at least one of Example 77 to Example 84 or another example or example herein, wherein the instructions further cause the runtime object identification module to prepare and output an object tensor, wherein the object tensor encodes at least one of an image portion corresponding to the object, the object, and the categorization of the object.

Example 86. The computer-readable media according to at least one of Example 77 to Example 85 or another example or example herein, wherein the instructions are further to cause the runtime object identification module to output at least one of an image portion corresponding to the object, the object, or the categorization of the object.

Example 87. The computer-readable media according to at least one of Example 77 to Example 86 or another example or example herein, wherein the instructions further cause the runtime object identification module to output at least one of the image portion corresponding to the object, the object, or the categorization of the object to a human for confirmation by the human.

Example 88. The computer-readable media according to at least one of Example 77 to Example 87 or another example or example herein, wherein the instructions are further to cause the runtime object identification module to save a human feedback regarding at least one of the image portion corresponding to the object, the object, or the categorization of the object as an object identification training data, and further cause the object identification training data to be used to train the object detection neural network to identify at least one of the image portion corresponding to the object, the object, or the categorization of the object.

Example 89. The computer-readable media according to at least one of Example 77 to Example 88 or another example or example herein, wherein the instructions are further to cause the computer device to determine at least one of a site map or a behavior of the object, and further comprising a runtime object time-series analysis module in the memory, and wherein to determine at least one of the site map or the behavior of the object, the instructions are further to cause the runtime object time-series analysis module to process the object tensor and obtain at least one of the site map or the behavior of the object from the runtime object time-series analysis module.

Example 90. The computer-readable media according to at least one of Example 77 to Example 89 or another example or example herein, wherein the instructions are further to cause the runtime object time-series analysis module to determine the behavior to comprise at least one of an object movement, a speed, an object movement preceding contact, an object contact, a crane pick, a hazardous condition, a theft, or an accident.

Example 91. The computer-readable media according to at least one of Example 77 to Example 90 or another example or example herein, wherein the crane pick comprises a crane picking up a suspended load.

Example 92. The computer-readable media according to at least one of Example 77 to Example 91 or another example or example herein, wherein the runtime object time-series analysis module comprises a time-series neural network.

Example 93. The computer-readable media according to at least one of Example 77 to Example 92 or another example or example herein, wherein the time-series neural network comprises a long short-term memory recurrent neural network.

Example 94. The computer-readable media according to at least one of Example 77 to Example 93 or another example or example herein, wherein the instructions are further to cause the runtime object time-series analysis module to output at least one of the site map or the behavior of the object.

Example 95. The computer-readable media according to at least one of Example 77 to Example 94 or another example or example herein, wherein the instructions are further to cause the runtime object time-series analysis module to output at least one of the site map or the behavior of the object to a human for confirmation by human.

Example 96. The computer-readable media according to at least one of Example 77 to Example 95 or another example or example herein, wherein the instructions are further to cause the runtime object time-series analysis module to save a human feedback regarding at least one of the site map or the behavior of the object as a time-series training data, wherein the time-series training data is to train the time-series neural network.

Example 97. The computer-readable media according to at least one of Example 77 to Example 96 or another example or example herein, further comprising an object identification neural training module in the memory and wherein the instructions are further to cause the computer device to execute the object identification neural training module and to thereby obtain an object identification training dataset, input into the object detection neural network a first portion of the object identification training dataset, train the object detection neural network to identify the object and to determine the categorization of the object, and to further test the object detection neural network with a second portion of the object identification training dataset.

Example 98. The computer-readable media according to at least one of Example 77 to Example 97 or another example or example herein, wherein the object identification training dataset comprises images, objects identified in such images, and categorizations of the objects identified in such images.

Example 99. The computer-readable media according to at least one of Example 77 to Example 98 or another example or example herein, further comprising in the memory a time-series neural training module wherein the instructions are further to cause the computer device to execute the time-series neural training module and to thereby obtain a time-series training dataset, input into the time-series neural network a first portion of the time-series training dataset, train the time-series neural network to identify the site map and the behavior according to the first portion of the time-series training dataset, and further to test the time-series neural network with a second portion of the time-series training dataset and to thereby train the time-series neural network to identify the site map and the behavior.

Example 100. The computer-readable media according to at least one of Example 77 to Example 99 or another example or example herein, wherein the time-series training dataset comprises images, objects identified in such images, categorizations of the objects identified in such images, site maps, and object behaviors.

Example 101. The computer-readable media according to at least one of Example 77 to Example 100 or another example or example herein, wherein the time-series training dataset comprises object tensors, wherein the object tensors encode at least one of images, objects identified in such images, or categorizations of the objects identified in such images, and wherein the time-series training dataset further comprises at least one of site maps and object behaviors to be derived from such object tensors.

Example 102. The computer-readable media according to at least one of Example 77 to Example 101 or another example or example herein, wherein the object sensor is a first object sensor and further comprising a second object sensor, wherein the second object comprises at least one of a wind speed sensor or a sensor suite of a suspended load control system.

Example 103. The computer-readable media according to at least one of Example 77 to Example 102 or another example or example herein, wherein the sensor data is a first sensor data, wherein the instructions are further to cause the computer device to associate a second sensor data with the categorization of the object, output a processed image to a human, determine the object to be present in the processed image to the human according to the categorization of the object and, due to the categorization of the object, output the second sensor data in the image output to the human in association with the object.

Example 104. The computer-readable media according to at least one of Example 77 to Example 103 or another example or example herein, wherein the second sensor data comprises at least one of wind speed, a state or parameter of a suspended load control device.

Example 105. The computer-readable media according to at least one of Example 77 to Example 104 or another example or example herein, wherein the instructions are further to cause the computer device to determine and output at least one of an equipment utilization, a vehicle utilization, a personnel utilization, or an alarm regarding identification of a behavior comprising a hazardous condition.

Example 106. The computer-readable media according to at least one of Example 77 to Example 105 or another example or example herein, further comprising an image stitching module in the memory and wherein the instructions are further to cause the computer device to execute the image stitching module and to thereby obtain a plurality of images of the site and combine the plurality of images to form the composite image of the site.

Example 107. The computer-readable media according to at least one of Example 77 to Example 106 or another example or example herein, wherein the instructions are further to cause the computer device to output the composite image of the site in conjunction with at least one of the object, the object category, the site map, or the behavior visually distinguished in the composite image of the site.

Example 108. The computer-readable media according to at least one of Example 77 to Example 107 or another example or example herein, wherein to combine the plurality of images to form the composite image of the site comprises causing the image stitching module to determine local invariant descriptors of keypoints of adjacent images in the plurality of images of the site, determine a group of matched local invariant descriptors of the keypoints, estimate a homography matrix using the matched local invariant descriptors of the keypoints, determine a warping matrix based on the homography matrix, and apply the warping matrix to the adjacent images in the plurality of images of the site to form the composite image of the site.

Example 109. The computer-readable media according to at least one of Example 77 to Example 108 or another example or example herein, wherein the instructions are further to cause the computer device to output a processed image to a human and output in the processed image to the human at least one of a behavior of the object or a second sensor data.

Example 110. The computer-readable media according to at least one of Example 77 to Example 109 or another example or example herein, wherein the instructions are further to cause the behavior to be identified as at least one of a human wearing a safety equipment, a human not wearing a safety equipment, an object movement, a speed, an object movement preceding contact, an object contact, a crane pick, a hazardous condition, a theft, an accident, or a crane pick.

Example 111. The computer-readable media according to at least one of Example 77 to Example 110 or another example or example herein, wherein the second sensor data comprises least one of a wind speed, a battery condition of a site equipment, or a state or parameter of a suspended load control system.

Example 112. The computer-readable media according to at least one of Example 77 to Example 111 or another example or example herein, wherein the hazardous condition comprises a person beneath a suspended load.

Example 113. The computer-readable media according to at least one of Example 77 to Example 112 or another example or example herein, wherein the state of the suspended load control system comprises at least one of a position, orientation, or motion of the suspended load control system and suspended load and wherein the parameter comprises at least one of a length of suspension cable, a moment of inertia of the suspended load control system and or suspended load, a mass of the suspended load control system and suspended load, a battery condition of the suspended load control system, a wind load of or disturbance force on the suspended load control system and or suspended load, a thruster setting or thrust output of the suspended load control system, and whether a suspended load control module of the suspended load control system is active in trying to control a thruster of the suspended load control system to influence a near-term future state or parameter of the suspended load control system and suspended load.

Example 114. The computer-readable media according to at least one of Example 77 to Example 113 or another example or example herein, wherein the object sensor comprises a suspended load control system, wherein the suspended load control system comprises a thruster, a sensor suite, and a suspended load control module, and further comprising a processor of the suspended load control system executing the suspended load control module and thereby estimating or predicting a state or parameter of the object based on a sensor data from the sensor suite.

Example 115. An apparatus to identify an object and determine a categorization of the object through visual analysis of a site comprising: a runtime object identification module in a memory of the apparatus, means to cause a processor of the apparatus to execute the runtime object identification module and means to thereby obtain an object sensor data with respect to the site, identify the object in the object sensor data, and determine the categorization of the object.

Example 116. The apparatus according to at least one of Example 115 or another example or example herein, wherein the site is a construction site.

Example 117. The apparatus according to at least one of Example 115 to Example 116 or another example or example herein, wherein the object sensor data comprises an image of the site.

Example 118. The apparatus according to at least one of Example 115 to Example 117 or another example or example herein, wherein means to determine the categorization of the object in the image comprises means to process the image with an object detection neural network and means to thereby identify the object in the image, determine the categorization of the object, and determine a confidence value with respect to at least one of the object or the categorization of the object.

Example 119. The apparatus according to at least one of Example 115 to Example 118 or another example or example herein, wherein the object detection neural network comprises a convolutional neural network.

Example 120. The apparatus according to at least one of Example 115 to Example 119 or another example or example herein, further comprising means to determine the categorization of the object in the image to be at least one of a carrier, a crane, a suspended load, a person, an authorized person, a non-authorized person, a safety equipment, a helmet, a visibility vest, a fence, a site mechanical equipment, suspended load control system, a site building, a site building material, or contacting objects.

Example 121. The apparatus according to at least one of Example 115 to Example 120 or another example or example herein, wherein the apparatus is to be suspended by a suspension cable of a construction crane above the site.

Example 122. The apparatus according to at least one of Example 115 to Example 121 or another example or example herein, wherein the apparatus is communicatively coupled to a suspended load control system.

Example 123. The apparatus according to at least one of Example 115 to Example 122 or another example or example herein, further comprising means for the runtime object identification module to prepare and output an object tensor, wherein the object tensor encodes at least one of an image portion corresponding to the object, the object, and the categorization of the object.

Example 124. The apparatus according to at least one of Example 115 to Example 123 or another example or example herein, further comprising means to cause the runtime object identification module to output at least one of an image portion corresponding to the object, the object, or the categorization of the object.

Example 125. The apparatus according to at least one of Example 115 to Example 124 or another example or example herein, further comprising means to cause the runtime object identification module to output at least one of the image portion corresponding to the object, the object, or the categorization of the object to a human for confirmation by the human.

Example 126. The apparatus according to at least one of Example 115 to Example 125 or another example or example herein, further comprising means to cause the runtime object identification module to save a human feedback regarding at least one of the image portion corresponding to the object, the object, or the categorization of the object as an object identification training data, and further cause the object identification training data to be used to train the object detection neural network to identify at least one of the image portion corresponding to the object, the object, or the categorization of the object.

Example 127. The apparatus according to at least one of Example 115 to Example 126 or another example or example herein, further comprising a runtime object time-series analysis module in the memory further comprising means to cause the runtime object time-series analysis module to process the object tensor and obtain at least one of the site map or the behavior of the object from the runtime object time-series analysis module.

Example 128. The apparatus according to at least one of Example 115 to Example 127 or another example or example herein, further comprising means to cause the runtime object time-series analysis module to determine the behavior to comprise at least one of an object movement, a speed, an object movement preceding contact, an object contact, a crane pick, a hazardous condition, a theft, or an accident.

Example 129. The apparatus according to at least one of Example 115 to Example 128 or another example or example herein, wherein the crane pick comprises a crane picking up a suspended load.

Example 130. The apparatus according to at least one of Example 115 to Example 129 or another example or example herein, further comprising means for the runtime object time-series analysis module to comprise a time-series neural network.

Example 131. The apparatus according to at least one of Example 115 to Example 130 or another example or example herein, wherein the time-series neural network comprises a long short-term memory recurrent neural network.

Example 132. The apparatus according to at least one of Example 115 to Example 131 or another example or example herein, further comprising means for the runtime object time-series analysis module to output at least one of the site map or the behavior of the object.

Example 133. The apparatus according to at least one of Example 115 to Example 132 or another example or example herein, further comprising means to cause the runtime object time-series analysis module to output at least one of the site map or the behavior of the object to a human for confirmation by human.

Example 134. The apparatus according to at least one of Example 115 to Example 133 or another example or example herein, further comprising means to cause the runtime object time-series analysis module to save a human feedback regarding at least one of the site map or the behavior of the object as a time-series training data, and further comprising means to use the time-series training data to train the time-series neural network.

Example 135. The apparatus according to at least one of Example 115 to Example 134 or another example or example herein, further comprising an object identification neural training module in the memory and further comprising means to cause the object identification neural training module to obtain an object identification training dataset, input into the object detection neural network a first portion of the object identification training dataset, train the object detection neural network to identify the object and to determine the categorization of the object, and to further test the object detection neural network with a second portion of the object identification training dataset.

Example 136. The apparatus according to at least one of Example 115 to Example 135 or another example or example herein, wherein the object identification training dataset comprises images, objects identified in such images, and categorizations of the objects identified in such images.

Example 137. The apparatus according to at least one of Example 115 to Example 136 or another example or example herein, further comprising in the memory a time-series neural training module and further comprising means to cause the time-series neural training module to obtain a time-series training dataset, input into the time-series neural network a first portion of the time-series training dataset, train the time-series neural network to identify the site map and the behavior according to the first portion of the time-series training dataset, and further to test the time-series neural network with a second portion of the time-series training dataset and to thereby train the time-series neural network to identify the site map and the behavior.

Example 138. The apparatus according to at least one of Example 115 to Example 137 or another example or example herein, wherein the time-series training dataset comprises images, objects identified in such images, categorizations of the objects identified in such images, site maps, and object behaviors.

Example 139. The apparatus according to at least one of Example 115 to Example 138 or another example or example herein, wherein the time-series training dataset comprises object tensors, wherein the object tensors encode at least one of images, objects identified in such images, or categorizations of the objects identified in such images, and wherein the time-series training dataset further comprises at least one of site maps and object behaviors to be derived from such object tensors.

Example 140. The apparatus according to at least one of Example 115 to Example 139 or another example or example herein, wherein the object sensor is a first object sensor and further comprising a second object sensor, wherein the second object comprises at least one of a wind speed sensor or a sensor suite of a suspended load control system.

Example 141. The apparatus according to at least one of Example 115 to Example 140 or another example or example herein, wherein the sensor data is a first sensor data, and further comprising means to cause the apparatus to associate a second sensor data with the categorization of the object, output a processed image to a human, determine the object to be present in the processed image to the human according to the categorization of the object and, due to the categorization of the object, output the second sensor data in the image output to the human in association with the object.

Example 142. The apparatus according to at least one of Example 115 to Example 141 or another example or example herein, wherein the second sensor data comprises at least one of wind speed, a state or parameter of a suspended load control device.

Example 143. The apparatus according to at least one of Example 115 to Example 142 or another example or example herein, further comprising means to determine and output at least one of an equipment utilization, a vehicle utilization, a personnel utilization, or an alarm regarding identification of a behavior comprising a hazardous condition.

Example 144. The apparatus according to at least one of Example 115 to Example 143 or another example or example herein, further comprising an image stitching module in the memory and further comprising means for the image stitching module to obtain a plurality of images of the site and combine the plurality of images to form the composite image of the site.

Example 145. The apparatus according to at least one of Example 115 to Example 144 or another example or example herein, further comprising means to output the composite image of the site in conjunction with at least one of the object, the object category, the site map, or the behavior visually distinguished in the composite image of the site.

Example 146. The apparatus according to at least one of Example 115 to Example 145 or another example or example herein, further comprising means to cause the image stitching module to determine local invariant descriptors of keypoints of adjacent images in the plurality of images of the site, determine a group of matched local invariant descriptors of the keypoints, estimate a homography matrix using the matched local invariant descriptors of the keypoints, determine a warping matrix based on the homography matrix, and apply the warping matrix to the adjacent images in the plurality of images of the site to form the composite image of the site.

Example 147. The apparatus according to at least one of Example 115 to Example 146 or another example or example herein, further comprising means to output a processed image to a human and output in the processed image to the human at least one of a behavior of the object or a second sensor data.

Example 148. The apparatus according to at least one of Example 115 to Example 147 or another example or example herein, further comprising means to cause the behavior to be identified as at least one of a human wearing a safety equipment, a human not wearing a safety equipment, an object movement, a speed, an object movement preceding contact, an object contact, a crane pick, a hazardous condition, a theft, an accident, or a crane pick.

Example 149. The apparatus according to at least one of Example 115 to Example 148 or another example or example herein, wherein the second sensor data comprises least one of a wind speed, a battery condition of a site equipment, or a state or parameter of a suspended load control system.

Example 150. The apparatus according to at least one of Example 115 to Example 149 or another example or example herein, wherein the hazardous condition comprises a person beneath a suspended load.

Example 151. The apparatus according to at least one of Example 115 to Example 150 or another example or example herein, further comprising means for the state of the suspended load control system to comprise at least one of a position, orientation, or motion of the suspended load control system and suspended load and means for the parameter to comprise at least one of a length of suspension cable, a moment of inertia of the suspended load control system and or suspended load, a mass of the suspended load control system and suspended load, a battery condition of the suspended load control system, a wind load of or disturbance force on the suspended load control system and or suspended load, a thruster setting or thrust output of the suspended load control system, and whether a suspended load control module of the suspended load control system is active in trying to control a thruster of the suspended load control system to influence a near-term future state or parameter of the suspended load control system and suspended load.

Example 152. The apparatus according to at least one of Example 115 to Example 151 or another example or example herein, wherein the object sensor comprises a suspended load control system, wherein the suspended load control system comprises a thruster, a sensor suite, and a suspended load control module, and further comprising means for a processor of the suspended load control system to execute the suspended load control module and to thereby estimate or predict a state or parameter of the object based on a sensor data from the sensor suite.

The invention claimed is:

1. A system to identify an object and determine a categorization of the object through visual analysis of a construction site comprising:
a computer processor and a memory;
a runtime object identification module in the memory;
wherein to identify the object and to determine the categorization of the object through visual analysis of the construction site, the computer processor is to execute the runtime object identification module and is to thereby obtain an object sensor data with respect to the construction site, identify the object in the object sensor data, and determine the categorization of the object, wherein the object sensor data comprises an image of the construction site;
wherein to determine the categorization of the object in the image, the runtime object identification module is to process the image with an object detection neural network and is to thereby identify the object in the image, determine the categorization of the object, and determine a confidence value with respect to at least one of the object or the categorization of the object;
wherein the runtime object identification module is to output an object tensor, wherein the object tensor encodes at least one of an image portion corresponding to the object, the object, and the categorization of the object;
wherein the system is further to determine at least one of a site map or a behavior of the object, wherein the system further comprises a runtime object time-series analysis module in the memory, and wherein to determine at least one of the site map or the behavior of the object, the computer processor is to execute the runtime object time-series analysis module, is to process the object tensor with a time-series neural network of the runtime object time-series analysis module and is to thereby obtain at least one of the site map or the behavior of the object from the runtime object time-series analysis module.

2. The system according to claim 1, wherein the runtime object identification module is to determine the categorization of the object in the image to comprise at least one of a carrier, a crane, a suspended load, a person, an authorized person, a non-authorized person, a safety equipment, a helmet, a visibility vest, a fence, a site mechanical equipment, suspended load control system, a site building, a site building material, or contacting objects; and
wherein the runtime object time-series analysis module is to determine the behavior to comprise at least one of an object movement, a speed, an object movement preceding contact, an object contact, a crane pick, a hazardous condition, a theft, or an accident.

3. The system according to claim 1, wherein the runtime object identification module is to output at least one of the image portion corresponding to the object, the object, or the categorization of the object to a human for confirmation by the human; and
wherein the runtime object identification module is to save a human feedback regarding at least one of the image portion corresponding to the object, the object, or the categorization of the object as an object identification training data, wherein the object identification training data is to train the object detection neural network to identify at least one of the image portion corresponding to the object, the object, or the categorization of the object.

4. The system according to claim 1, wherein the runtime object time-series analysis module is to output at least one of the site map or the behavior of the object to a human for confirmation by human and wherein the runtime object time-series analysis module is to save a human feedback regarding at least one of the site map or the behavior of the object as a time-series training data, wherein the time-series training data is to train a time-series neural network of the runtime object time-series analysis module.

5. The system according to claim 1, wherein the system is further to train the object detection neural network to identify the object and to determine the categorization of the object and further comprising in the memory an object identification neural training module, wherein to train the object detection neural network to identify the object and to determine the categorization of the object, the object identification neural training module is to obtain an object identification training dataset, input into the object detection neural network a first portion of the object identification training dataset, train the object detection neural network to identify the object and to determine the categorization of the object, and is further to test the object detection neural network with a second portion of the object identification training dataset.

6. The system according to claim 1, wherein the system is further to train the time-series neural network to identify the site map and the behavior and further comprising in the memory a time-series neural training module, wherein to train time-series neural network to identify the site map and the behavior the time-series neural training module is to obtain a time-series training dataset, input into the time-series neural network a first portion of the time-series training dataset, train the time-series neural network to identify the site map and the behavior according to the first portion of the time-series training dataset, and is further to test the time-series neural network with a second portion of the time-series training dataset.

7. The system according to claim 1, wherein the sensor data is a first sensor data, wherein the system is further to associate a second sensor data with the categorization of the object, and wherein the system is further to output a processed image to a human, determine the object to be present in the processed image to the human according to the categorization of the object and, due to the categorization of the object, is to output the second sensor data in the image output to the human in association with the object.

8. The system according to claim 1, wherein the system is further to determine and output at least one of an equipment utilization, a vehicle utilization, a personnel utilization, or an alarm regarding identification of the behavior comprising a hazardous condition.

9. The system according to claim 1, wherein the system is further to stitch together a plurality of images of the construction site into a composite image of the construction site and further comprising an image stitching module in the memory, wherein to stitch together the plurality of images of the construction site into the composite image of the construction site, the computer processor is to execute the image stitching module, obtain a plurality of images of the construction site, and combine the plurality of images to form the composite image of the construction site; and wherein the system is further to output the composite image of the construction site in conjunction with at least one of the object, the object category, the site map, or the behavior visually distinguished in the composite image of the construction site.

10. The system according to claim 1, further comprising a second object sensor, wherein the second object sensor comprises a suspended load control system, wherein the suspended load control system comprises a thruster, a sensor suite, and a suspended load control module, wherein the suspended load control module is to be executed by a processor of the suspended load control system, is to estimate or predict a state or parameter of the suspended load control system based on sensor data from the sensor suite, and is to output the state or parameter of the suspended load control system as the second object sensor data.

11. A method to identify an object and determine a categorization of the object through visual analysis of a construction site comprising:

with a computer processor, a memory and a runtime object identification module in the memory,
wherein the method to identify the object and to determine the categorization of the object through visual analysis of the construction site comprises the computer processor executing the runtime object identification module and thereby obtaining an object sensor data with respect to the construction site, identifying the object in the object sensor data, and determining the categorization of the object, wherein the object sensor data comprises an image of the construction site, wherein determining the categorization of the object in the image of the construction site comprises processing the image of the construction site with an object detection neural network of the runtime object identification module and thereby identifying the object in the image, determining the categorization of the object, and determining a confidence value with respect to at least one of the object or the categorization of the object;

further comprising the runtime object identification module preparing and outputting an object tensor, wherein the object tensor encodes at least one of an image portion corresponding to the object, the object, and the categorization of the object;

wherein the method is further to determine at least one of a site map or a behavior of the object, further comprising a runtime object time-series analysis module in the memory, and wherein to determine at least one of the site map or the behavior of the object further comprises the computer processor executing the runtime object time-series analysis module and thereby processing the object tensor with a time-series neural network of the runtime object time-series analysis module and obtaining at least one of the site map or the behavior of the object from the runtime object time-series analysis module.

12. The method according to claim 11, further comprising the runtime object identification module outputting at least one of the image portion corresponding to the object, the object, or the categorization of the object to a human for confirmation by the human;

further comprising the runtime object identification module saving a human feedback regarding at least one of the image portion corresponding to the object, the object, or the categorization of the object as an object identification training data, and further comprising the object identification training data to be used to train the object detection neural network to identify at least one of the image portion corresponding to the object, the object, or the categorization of the object.

13. The method according to claim 11, further comprising the runtime object time-series analysis module outputting at least one of the site map or the behavior of the object to a human for confirmation by human;

further comprising the runtime object time-series analysis module saving a human feedback regarding at least one of the site map or the behavior of the object as a time-series training data, wherein the time-series training data is to train the time-series neural network.

14. The method according to claim 11, wherein the method is further to train the time-series neural network to identify the site map and the behavior and further comprising in the memory a time-series neural training module, wherein to train time-series neural network to identify the site map and the behavior comprises the time-series neural training module obtaining a time-series training dataset, inputting into the time-series neural network a first portion of the time-series training dataset, training the time-series neural network to identify the site map and the behavior according to the first portion of the time-series training dataset, and further testing the time-series neural network with a second portion of the time-series training dataset.

15. The method according to claim 11, wherein the sensor data is a first sensor data, wherein the method further comprises associating a second sensor data with the categorization of the object, outputting a processed image to a human, determining the object to be present in the processed image to the human according to the categorization of the object and, due to the categorization of the object, outputting the second sensor data in the image output to the human in association with the object.

16. The method according to claim 11, wherein the method further comprises determining and outputting at least one of an equipment utilization, a vehicle utilization, a personnel utilization, or an alarm regarding identification of the behavior comprising a hazardous condition.

17. The method according to claim 11, wherein the method further comprises outputting a processed image to a human and outputting in the processed image to the human at least one of the behavior of the object or a second sensor data, wherein the second sensor data comprises least one of a wind speed, a battery condition of a site equipment, or a state or parameter of a suspended load control system.

18. An apparatus to identify an object and determine a categorization of the object through visual analysis of a construction site comprising:
- a runtime object identification module in a memory of the apparatus, means to cause a processor of the apparatus to execute the runtime object identification module and means to thereby obtain an object sensor data with respect to the construction site, identify the object in the object sensor data, and determine the categorization of the object, wherein the object sensor data comprises an image of the construction site;
- wherein means to determine the categorization of the object in the image comprises means to process the image with an object detection neural network and means to thereby identify the object in the image, determine the categorization of the object, and determine a confidence value with respect to at least one of the object or the categorization of the object;
- further comprising means for the runtime object identification module to prepare and output an object tensor, wherein the object tensor encodes at least one of an image portion corresponding to the object, the object, and the categorization of the object;
- further comprising a runtime object time-series analysis module in the memory and further comprising means to cause the runtime object time-series analysis module to process the object tensor with a time-series neural network of the runtime object time-series analysis module and thereby obtain at least one of the site map or the behavior of the object from the runtime object time-series analysis module.

19. The apparatus according to claim 18, wherein the object detection neural network comprises a convolutional neural network.

20. The apparatus according to claim 18, wherein the time-series neural network comprises a long short-term memory recurrent neural network.

* * * * *